(12) United States Patent
Torretta et al.

(10) Patent No.: US 12,413,523 B1
(45) Date of Patent: Sep. 9, 2025

(54) LOW-LATENCY STATEFUL LOAD-BALANCED CONNECTIONS USING STATELESS LOAD BALANCERS

(71) Applicant: Amazon Technologies, Inc., Seattle, WA (US)

(72) Inventors: Ethan Joseph Torretta, Edmonds, WA (US); Schuyler David Thompson, Seattle, WA (US); Jose De Jesus Camacho Ruiz, Woodinville, WA (US); Aaron Graydon Bannert, Seattle, WA (US); Gowtham Kumar Puligundla, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 426 days.

(21) Appl. No.: 17/937,398

(22) Filed: Sep. 30, 2022

(51) Int. Cl.
*H04L 47/125* (2022.01)
*H04L 67/1031* (2022.01)

(52) U.S. Cl.
CPC ........ *H04L 47/125* (2013.01); *H04L 67/1031* (2013.01)

(58) Field of Classification Search
CPC .......................... H04L 47/125; H04L 67/1031
See application file for complete search history.

(56) References Cited

U.S. PATENT DOCUMENTS

| | | | |
|---|---|---|---|
| 8,825,867 B2 | 9/2014 | Arisoylu et al. | |
| 8,850,002 B1 | 9/2014 | Dickinson et al. | |
| 9,137,165 B2 | 9/2015 | Anand et al. | |
| 9,379,982 B1 * | 6/2016 | Krishna | H04L 67/1034 |
| 9,503,391 B2 | 11/2016 | Xia et al. | |
| 9,621,642 B2 | 4/2017 | Ganesh et al. | |
| 9,628,380 B2 | 4/2017 | Xia et al. | |
| 9,998,955 B1 | 6/2018 | MacCarthaigh et al. | |
| 10,187,263 B2 | 1/2019 | Sunavala et al. | |
| 10,425,473 B1 * | 9/2019 | Patel | H04L 67/1097 |
| 10,432,537 B2 | 10/2019 | Zhang et al. | |
| 10,476,799 B2 | 11/2019 | Chung et al. | |
| 10,616,321 B2 | 4/2020 | Abhigyan Joshi et al. | |
| 10,979,361 B2 | 4/2021 | Abhigyan et al. | |
| 11,063,847 B2 | 7/2021 | Wang et al. | |
| 11,601,497 B1 * | 3/2023 | Abhigyan | H04L 67/1031 |

(Continued)

OTHER PUBLICATIONS

U.S. Appl. No. 17/937,399, filed Sep. 30, 2022, Ethan Joseph Torretta, et al.

*Primary Examiner* — Suraj M Joshi
(74) *Attorney, Agent, or Firm* — Robert C. Kowert; Kowert, Hood, Munyon, Rankin & Goetzel, P.C.

(57) ABSTRACT

A network connection is established between a client program and a particular request handler of a network-accessible service. The request handler is selected by a load balancer using an algorithm whose input includes configuration information of the service. The load balancer does not store flow state information for messages transmitted via the network connection. A networking manager of a host at which the client program runs stores the flow state information, including identification information of the particular request handler. Using the identification information, the networking manager causes additional messages directed to the service from the client program to be received at the particular request handler without using the load balancer as an intermediary.

20 Claims, 17 Drawing Sheets

(56) References Cited

U.S. PATENT DOCUMENTS

| | | |
|---|---|---|
| 2015/0189009 A1 | 7/2015 | van Bemmel |
| 2019/0007320 A1 * | 1/2019 | Sukhomlinov |
| 2019/0215270 A1 * | 7/2019 | Timmons ................ H04L 45/38 |
| 2019/0373506 A1 | 12/2019 | Harari et al. |
| 2020/0344171 A1 | 10/2020 | Sharma |
| 2022/0150303 A1 | 5/2022 | Quevedo |
| 2023/0198907 A1 | 6/2023 | Raghavan |

\* cited by examiner

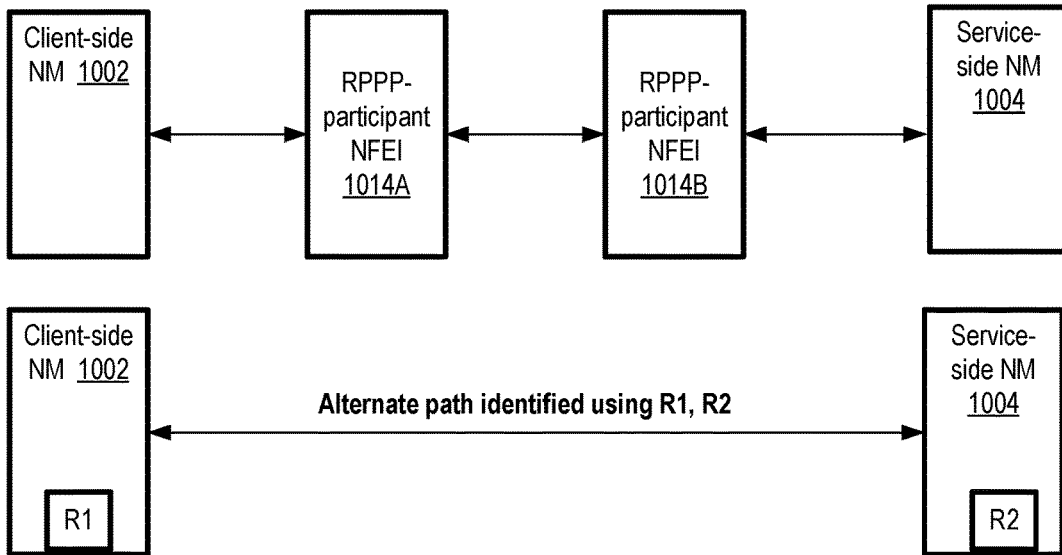
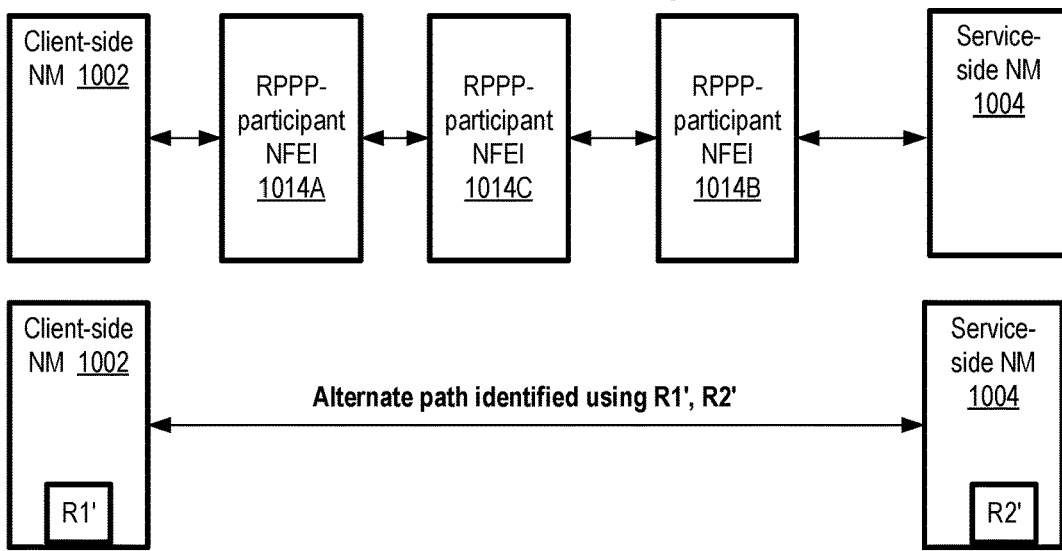
FIG. 10

Scenario C: A third NFEI which cannot be bypassed, but has an NM, is added to NFEI chain
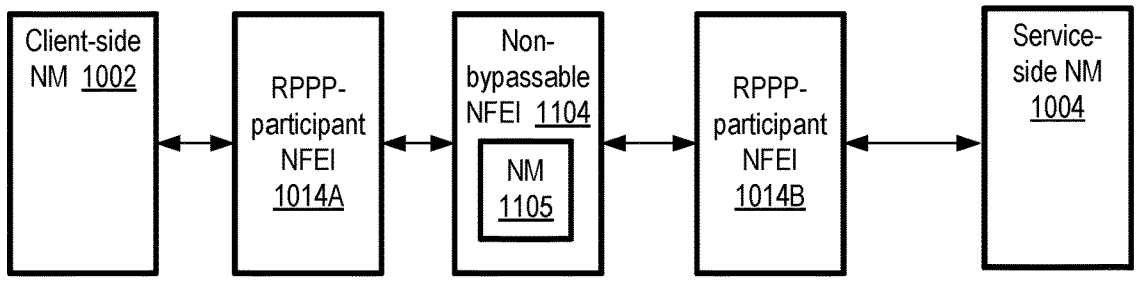
Alternate path now includes the new NFEI; rules R3 and R4 are used for traffic between client and NFEI 1104, and rules R5 and R6 are used for traffic between NFEI 1104 and service-side NM
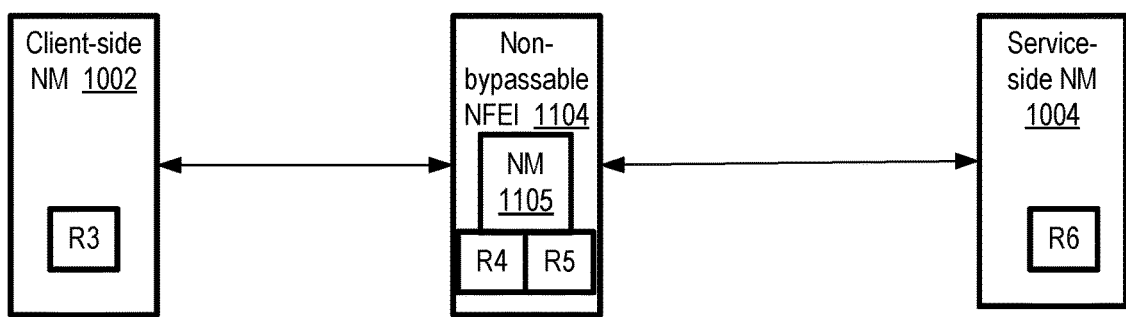
FIG. 11

```
┌─────────────────────────────────────────────────────────────────────────┐
│ A stateless load balancer LB1 (which can include several nodes of a network function implementation │
│ service) is established to distribute messages directed to a network-accessible service (NS1) among │
│ a set of request handlers (RHs) of the service; input to LB1's load balancing algorithm includes │
│ properties of the received message (e.g., client program IP address, IVN ID, etc.) as well as the │
│ current configuration of NS1 (e.g., including how many RHs there are, IVN addresses of the RHs, │
│ recent workload levels of the RHs, etc.), such that at least some changes to the NS1 configuration │
│ would (probabilistically) result in selection of different RHs for a given message directed to LB1  1501 │
└─────────────────────────────────────────────────────────────────────────┘
                                          │
                                          ▼
┌─────────────────────────────────────────────────────────────────────────┐
│ For a message M1, requesting establishment of a connection with NS1 from a client program CP1 │
│ (running at a host H1 with a networking manager NM1), LB1 selects RH RH1 using the algorithm, │
│ and a connection Conn1 is established between CP1 and RH1; flow state information of the │
│ messages transmitted via Conn1 (including for example a record indicating that RH1 was selected for │
│ the connection) is not stored at LB1   1507 │
└─────────────────────────────────────────────────────────────────────────┘
                                          │
                                          ▼
┌─────────────────────────────────────────────────────────────────────────┐
│ NM1 stores flow state information of Conn1, including configuration information of RH1 such as a │
│ physical network address of a host H2 at which RH1 runs; similarly, networking manager NM2 at a │
│ H2 stores flow state information of Conn1 including H1's physical network address    1510 │
└─────────────────────────────────────────────────────────────────────────┘
                                          │
                                          ▼
┌──────────────────────────────────────┐     ┌──────────────────────────────────────┐
│ For a time period T1 after Conn1 is  │     │ During time period T1, NM1 and NM2 cause │
│ established, the configuration information of │────▶│ messages directed from CP1 to NS1, and │
│ NS1, which was used for the load balancing │     │ from NS1 to CP1, to be transmitted via a │
│ algorithm during Conn1's establishment, │     │ path which does not include LB1   1516 │
│ remains unchanged (and LB1's internal │     └──────────────────────────────────────┘
│ configuration remains unchanged)  1513 │
└──────────────────────────────────────┘
                    │
                    ▼
┌──────────────────────────────────────┐     ┌──────────────────────────────────────┐
│ NS1 configuration changes (e.g., RHs are │     │ During time period T2 after NS1 or LB1 │
│ added or removed) and/or LB1 configuration │────▶│ configuration changes, (as long as RH1 │
│ changes, which would have led to a   │     │ remains healthy) NM1 and NM2 continue to │
│ selection (by LB1) of a different RH RH2 for │     │ use path which does not include LB1  1522 │
│ messages from CP1   1519             │     └──────────────────────────────────────┘
└──────────────────────────────────────┘
```

*FIG. 15*

LOW-LATENCY STATEFUL LOAD-BALANCED CONNECTIONS USING STATELESS LOAD BALANCERS

BACKGROUND

In recent years, various kinds of network-accessible services, including virtualized computing services, database management services for structured data, object storage services for unstructured data, machine learning services and the like have been implemented using resources of cloud provider networks. Customers of the cloud provider networks can for example store their application data within the database or storage services, and access the data from client programs at compute instances launched on the customers' behalf at the virtualized computing services. The data can be analyzed using models developed at a machine learning service or using tools of some other analytics service of the cloud provider network if desired. Depending on the way in which the compute instances are configured and the manner in which the other network-accessible services are architected, service requests (and corresponding responses) can sometimes be transmitted between client programs and service components over network paths that include several intermediaries. Such intermediaries can include, among others, Internet gateways, load balancers and the like.

BRIEF DESCRIPTION OF DRAWINGS

FIG. 10 and FIG. 11 illustrate example scenarios in which additional network function execution intermediaries may be introduced into a chain of intermediaries set up between clients and a service, according to at least some embodiments.

FIG. 15 is a flow diagram illustrating aspects of operations that may be performed to enable low-latency stateful load balanced connections to be established with the help of a stateless load balancer, according to at least some embodiments.

Figure 1:
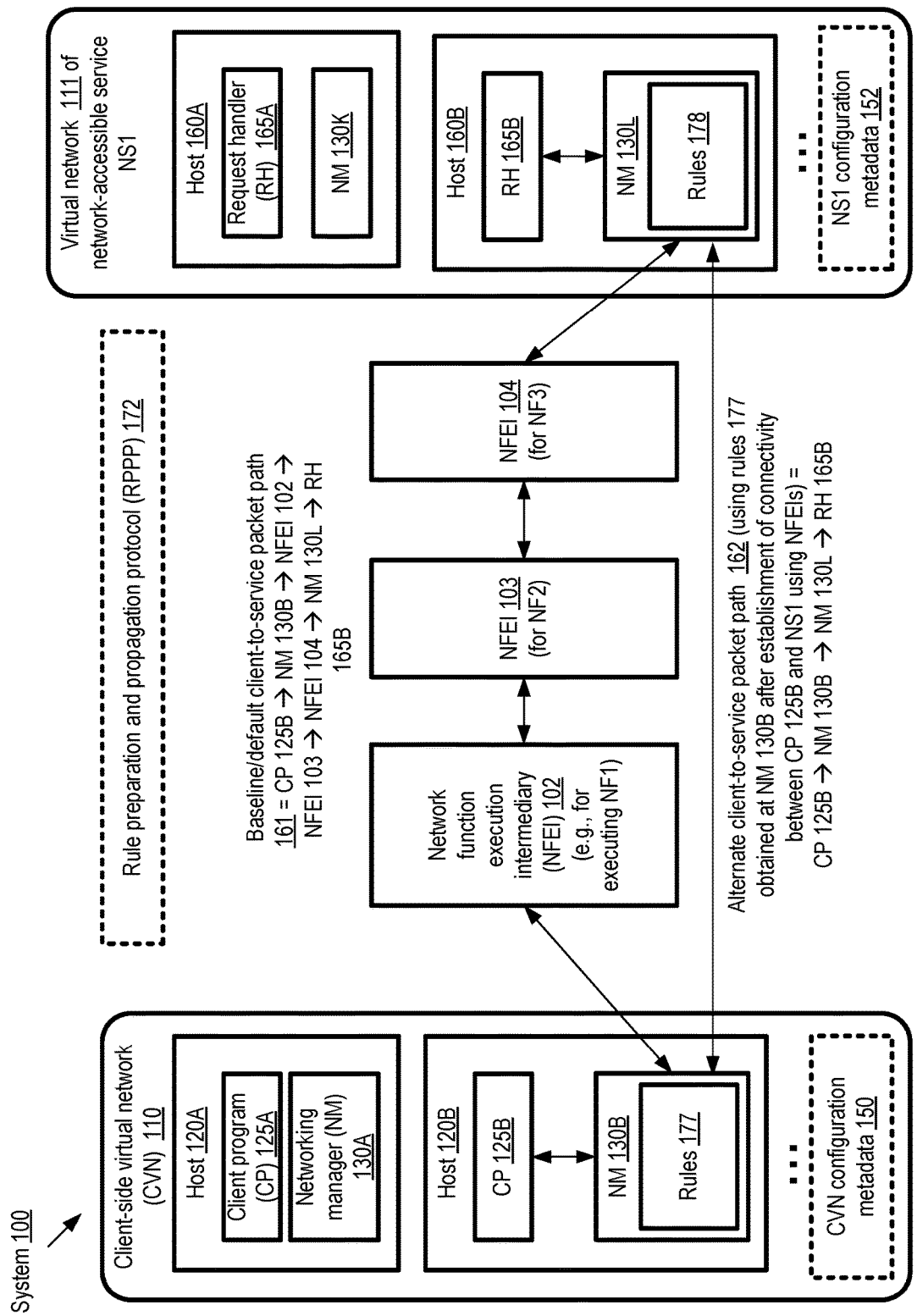
FIG. 1 illustrates an example system environment in which, after connectivity has been established between client programs and a network-accessible service using messages transmitted via paths which include several network function execution intermediaries, subsequent traffic between the client programs and the service may be transmitted via alternate paths which do not include the intermediaries, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for reducing the latency of message transfers between client programs, running at virtualization hosts of a cloud provider network, and a network-accessible service (such as a database or storage service) implemented at the cloud provider network. The client programs (CPs) can run within compute instances (virtual machines) of a virtualized computing service (VCS) of the provider network, with a group of such compute instances typically configured within an isolated virtual network (IVN) set up on behalf of a customer of the VCS. Private network addresses can be assigned to individual compute instances used for the CPs, e.g., within a range of network addresses selected by the customer for the IVN. Various types of internal configuration information of the IVNs are typically not accessible outside the IVNs; for example, private network addresses within a given IVN may not be known or advertised, at least by default, outside that IVN. Each IVN has an associated set of security rules selected by the customer on whose behalf the IVN is established, such as firewall rules governing the addresses to/from which traffic can enter the IVN or leave the IVN. Components of the network-accessible service, such as service request handlers (RHs) responsible for initial processing of requests from service clients, as well as back-end service business logic execution nodes, can also be run on compute instances of the VCS, e.g., within IVNs configured for use by the service. The compute instances being used for the service components can also be assigned private addresses within the service-side IVNs. A dynamically-scaled pool of RHs and/or other service components is typically established, with incoming service requests originating at the CPs being distributed among the RHs using load balancing algorithms.

A CP from which a service request message (such as a message to establish connectivity with the network-accessible service, or a message requesting the service to perform some operation after the connectivity has been established) is to be sent to the network-accessible service can use a domain address (e.g., a publicly-accessible Internet Protocol (IP) address obtained via a Domain Name System or DNS request specifying the service name) to indicate the intended destination of the message. The process of transmitting the message to the service can require several types of packet processing operations. These operations, which can include for example verifying that the request complies with applicable security rules, obtaining mappings between private addresses of compute instances within IVNs and the physical network addresses of the hosts at which the compute instances are run, performing network address translations when needed, generating encapsulation packets within which the original messages originating at the client programs are to be sent to the service, selecting a particular RH using a load balancing algorithm, and the like, are referred to as network functions. In many cases, a chain of several network function execution intermediaries (e.g., distinct devices at each of which a particular type of network function is performed, using some combination of software and hardware, with respect to a given message flowing along the chain) may be employed. For example, in a scenario in which the network-accessible service is accessible via addresses of the public Internet, a chain of network function execution intermediaries (NFEIs) used for a connection establishment message from a CP run in an IVN can include an Internet gateway set up for the IVN (which can verify that traffic to the public Internet is permitted from the compute instance at which the CP runs), as well as a load balancer set up for distributing workload among RHs of the service. A given NFEI can in general use locally available information or metadata (e.g., security rules pertaining to a client IVN, internal configuration information of the targeted network-accessible service, etc.), which is not necessarily available to other NFEIs or at the hosts at which the CPs or RHs run, to perform its network function. Furthermore, in some cases, a given NFEI can itself be implemented using a collection of nodes, and messages can be transmitted among multiple such nodes for executing the network function(s) of the NFEI. The NFEIs may run on respective hosts (other than the hosts used for the CP and the RHs) in at least some embodiments; an over-the-network transmission or "hop" may be required to reach an NFEI in such embodiments.

In scenarios in which multiple network functions (NFs) are executed at respective NFEIs along a message path from a CP to a network-accessible service, transmission of the message between a given pair of NFEIs adds to the overall latency of the message transfer. Similar latencies can be experienced for messages from the service to the CP, which can also involve multiple NFEIs. The transmission of messages from a CP to the service is referred to herein as forward direction traffic, and the transmission of messages from the service to the CP is referred to as reverse direction traffic. In many cases, a given NFEI of a chain may have enough information available to direct a message on the next hop towards its intended destination (e.g., to the next NFEI of the chain in the forward direction or the reverse direction), but may not have sufficient information to enable the message to skip or bypass other NFEIs.

For some latency-sensitive applications, the total time taken for a response to be received for a given service request from a CP (which can include the sum of the latencies for multiple inter-NFEI message transfers on the forward direction path from the CP to the service, as well as the sum of latencies for multiple inter-NFEI message transfers on the reverse direction path from the service to the CP) can become excessive. For at least some such applications, while all the network functions may be executed initially at the respective NFEIs of the chain during the process of establishing connectivity between a CP and a targeted network-accessible service (e.g., because the information needed to execute the network functions is available at those NFEIs and not necessarily available at other components of the system), rules or algorithms that represent logical equivalents of the combination or composition of network functions of the chain can be formulated or generated. Such rules or algorithms can then be installed and applied, for example at the hosts at which CPs and service RHs are run, for subsequent messages between the CP and the targeted service in either direction, thereby eliminating the need for at least some of the intermediaries of the NFEI chain for the subsequent messages. Such a rule can in effect enable a result of applying a sequence of network functions to be obtained at a single host (e.g., a virtualization host at which a client program runs, or a virtualization host at which a request handler of the targeted service runs), instead of using a sequence of intermediary devices to obtain the result.

In some cases, respective networking managers (NMs) run at the hosts (e.g., executed within virtualization managers of the hosts) can obtain, store and execute the rules, enabling at least some of the NFEIs to be bypassed for messages sent after connectivity has been established. Such NMs can also periodically, or in response to various other types of triggering conditions, verify that the rules remain valid—e.g., so as to avoid sending messages along a path which would no longer be acceptable if the original chain of NFEIs were re-used instead of being bypassed. In some cases, the rules can be as simple as a lookup within a table to identify a destination host's physical network address for packets of a given packet flow; in other cases, the NMs may run more complex executable programs to obtain the result of the combination of network functions. The use of the rules can lead to lower-latency paths (with fewer logical hops, and in many cases fewer physical hops) for traffic in either direction between CPs and targeted network-accessible services, thereby helping achieve lower response times needed for some types of applications built using the services. In scenarios in which a CP and/or the RH selected for the CP are run on compute instances of a VCS, lower-latency paths can be used even if one or both of the compute instances is migrated to another host. For example, in the case where the RH is migrated from host H1 (with an NM NM1) to host H2 (with NM NM2) after connectivity between the RH and the CP is established, and the CP runs at host H3 (with NM NM3), NM1 and/or NM2 can communicate with NM3 to inform NM3 about the migration and/or to update the rule being used by NM3, thereby enabling the use of a lower-latency path between the CP and the service to continue. Because the RH has been migrated, a different lower-latency path may be used after the migration, while still bypassing the NFEIs. Note that neither the CPs not the RHs may be aware that a shorter alternate path is being used with the help of such rules; from the perspective of the CPs and the RHs, the network traffic may appear to be identical to the traffic that would have been sent/received if the entire chain of NFEIs were being used for every message. The NMs may also perform network functions in at least some embodiments, and may therefore also be considered NFEIs on the paths between CPs and the targeted services; however, because the NMs can run at the same host as the CPs or the RHs, the latency between NMs and CPs/RHs may be quite small compared to the network hop latencies between NFEIs that are implemented at other devices than the host. The NFEIs that can only be reached via one or more network hops may be referred to as remote NFEIs in some embodiments.

In addition to reducing latency, rules of the kind introduced above, which can in effect replace at least some NFEIs for most of the traffic between clients and services, can also be used to implement low-latency stateful connectivity while using stateless NFEIs. For example, stateless load balancers (which do not maintain flow state information indicating the host at which an RH selected for a given message from a CP runs) can be used to establish connections between CPs and RHs. The flow state information of the connections can instead be maintained at the NMs, e.g., in accordance with, or as part of, the rules obtained at the NMs. With the help of the flow state information, messages may be sent in either direction between CPs and the service without using the NFEI(s) used for load balancing as intermediaries. Even if the configuration of the targeted services changes (which would normally lead to a high probability of selection of a different RH, e.g., if connectivity establishment were attempted again from the CP or if data packets from the CP were sent after the configuration change to the service), the flow state information saved at the NMs may enable traffic to be transmitted to the same RH which was identified earlier by the load balancer for the CP, using a path which bypasses the load balancer, as long as the RH remains responsive and accessible.

As one skilled in the art will appreciate in light of this disclosure, certain embodiments may be capable of achieving various advantages, including some or all of the following: (a) reducing the latencies for client-server interactions of various network-accessible services implemented at cloud provider networks, without requiring any code changes or configuration changes at the CPs or to RHs and other components of the services, (b) enabling deployment of additional network functions along the paths between CPs and service components, thereby providing richer functionality for applications using such services, without incurring performance penalties for the majority of client-server interactions, (c) enabling stateful connections to be used for traffic between CPs and services using stateless (and therefore more robust and simpler) NFEIs, and/or (d) enabling more agile development and rollout of network function pipelines while maintaining targeted performance levels, e.g., with small dedicated teams of software engineers with expertise on specific kinds of networking tasks being able to work on individual network functions that can then be deployed to respective sets of intermediary devices, resulting in longer pipelines of smaller-scale individual network functions.

According to some embodiments, a system may comprise a first host, a second host, and a set of NFEIs. The first host may include a first NM and a CP of a network-accessible service implemented at a cloud provider network. The CP may run at a first execution environment (e.g., a compute instance, virtual machine or software container) within a first IVN of the cloud provider network in one embodiment. The second host may include a second NM and an RH of the network-accessible service. The RH may run at a second execution environment within a second IVN of the cloud provider network in some embodiments. The RH may be responsible for at least some operations that are to be performed at the network-accessible service in response to client requests. For example, in some cases the RH may check that a client request is formatted correctly and is from an acceptable source, and pass on the request to a selected back end business logic implementation node of the service, while in other cases the RH may itself implement business logic and provide a result which can be sent to the CP.

A particular NFEI of the set of NFEIs may obtain a result of execution of a sequence of NFs associated with a particular packet or message directed to the network-accessible service from the client program, in various embodiments. The sequence of NFs may for example comprise (a) a first network function executed at another NFEI and (b) a second network function executed at the particular NFEI. In some embodiments, execution of at least one NF of the sequence may comprise using information, pertaining for example to the IVN at which the RH runs, that is not available at the first host. The particular NFEI may cause, based at least in part on the result of the execution of the sequence of NFs, the particular packet to be delivered to the RH at the second host via the second NM. A first path by which the particular packet is delivered to the RH may comprise the first NM, the other NFEI, the particular NFEI, and the second NM. Note that in at least some implementations, each of the NFEIs may be implemented at a respective host or server of the cloud provider network, so that transfers of packets between the NFEIs (and between the NFEIs and the NMs) may require respective over-the-network transmissions, while transfers of packets between the first NM and the CP may not require over-the-network transmission, and transfers of packets between the second NM and the RH may not require over-the-network transmissions.

In various embodiments, the first NM may be configured to obtain an algorithm for determining, at the first host, a result of executing the sequence of NFs with respect to additional packets that originate at the CP and are directed to the network-accessible service. Using the algorithm (which may also be referred to a rule or a set of rules), the first NM may cause another packet originating at the CP to be delivered to the RH via a second path. The second path may not include either of the NFEIs, and may be referred to as a bypass path. In at least one embodiment, the first NM may verify, after one or more packets including the other packet have been transmitted using the algorithm, that the algorithm remains valid for determining the result of executing the sequence of NFs.

In some embodiments, the verification of the algorithm or rule may be based on a detection of a triggering condition by the first NM. Examples of detecting the triggering condition may include, among others, determining that a time that has elapsed since a particular event (e.g., the establishment of connectivity between the CP and the RH, or a transmission of a particular packet to the RH) exceeds a threshold, or that the number of packets that have been transmitted between the CP and the RH since a previous verification of the algorithm (or since connectivity was established) exceeds a threshold. In one embodiment, the first NM may generate a synthetic packet (which does not include content or data originating at the CP), and send that synthetic packet along a path which includes at least one of the NFEIs. If the verification fails, e.g., if a result of the verification operation initiated by the first NM indicates that the algorithm or rule is no longer valid, a new rule or algorithm may be obtained at the first NM, e.g., using the NFEIs that were used initially.

Any of a variety of techniques may be employed in different embodiments for obtaining the algorithm/rule at an NM. In one embodiment, the algorithm may be indicated in a header of an encapsulation protocol packet received at the first NM, e.g., from one of the NFEIs. The contents of header may be generated by one or more of the NFEIs in some embodiments. The data portion or body of the encapsulation protocol packet may comprise a response from the RH to a packet sent by the CP in at least some embodiments.

According to some embodiments, the execution environment of the CP may be assigned a first network address within the first IVN of the cloud provider network, while the execution environment of the RH may be assigned a second network address within the second IVN of the cloud provider network. The first host may be assigned a network address (distinct from the network address of the CP's execution environment) within a physical network of the cloud provider network, and the second host may be assigned another network address (different from the network address of the RH's execution environment) within the physical network. In accordance with the rule or algorithm, packets may be sent from the CP to the RH using the physical network address of the RH's host as a destination address of an encapsulation packet created by the first NM. Similarly, in accordance with a similar rule or algorithm obtained by the second NM, packets may be sent from the RH to the CP using the physical network address of the CP's host as a destination address of an encapsulation packet created by the second NM. In some implementations, a direct physical network link between the CP's host and the RH's host may be employed for the packets sent using the rules.

In one embodiment, the NM at the host at which a CP runs (which may be termed the client-side NM) and the NM at the host at which the RH selected for the CP runs (which may be termed the service-side NM) may both maintain flow state information about packet flows between the CP and the RH. Packet flows may be distinguished from one another by a flow tuple comprising at least a source IP address (e.g., an IP address assigned to the CP's host, within an IVN established at the request of a customer of the service), a destination IP address (e.g., an IP address obtained at the CP from a DNS server in response to a DNS query for accessing the network-accessible service), a source port, a destination port, a protocol identifier (e.g., indicating that TCP is being used). In some embodiments the flow tuple may also include other elements, such as an IVN identifier of the client-side IVN being used and/or an IVN identifier of an IVN within which the RH runs. The flow state information may include statistics such as the number of packets that have been sent, the time since the most recent packet was sent, one or more intermediary devices being used for the packets of the flow (if NFEIs are being used), and so on in some embodiments. In some embodiments, when the first packet P1 of a flow (i.e., a packet for a flow for which there is not an existing flow state entry at the client-side NM) is received at the client-side NM, a token or nonce indicating that connection establishment is underway may be stored in a new flow state entry created for the flow. This token, Token A, may be included in an encapsulation protocol packet header created by the NM (within which the packet P1 originating at the CP is contained) and sent via the chain of NFEIs to the service. Packet P1 may comprise a TCP SYN packet in some implementations.

One or more of the NFEIs along the path used for this initial packet P1 may add, to an encapsulation protocol header, a rule or algorithm that can be used by the selected RH for sending packets back to the CP via a path which bypasses the NFEIs. Upon receiving the encapsulation packet, the service-side NM may store the rule or algorithm locally, but may not actually use it until connectivity establishment with the CP has been confirmed. The presence of the token (Token A) included in the packet received at the service-side NM may indicate that connectivity has not yet been established. The RH may send back a response packet (P2, such as a SYN-ACK packet in a scenario in which P1 was a SYN packet) to the initial packet P1 via the service-side NM and the RFEI chain. The service-side NM may include a second token or nonce (Token B), in addition to the token (Token A) sent earlier from the client-side NM, in a second encapsulation packet directed via the NFEIs to the client-side NM. One or more of the NFEIs on the reverse-direction path (from the RH to the CP) may add a second rule or algorithm to an encapsulation packet header used for the response from the RH. This second rule may be used by the client-side NM for bypassing the NFEIs when sending subsequent packets of the flow from the CP to the service. The client-side NM may validate that the token (Token A) it had sent earlier matches a token contained in the encapsulation packet it receives. The client-side NM may send a packet P3 (which also contains the second token, Token B) using the second rule to the service-side NM via a path which bypasses the NFEIs. Upon receiving this packet, the service-side NM may validate that it has received the token (Token B) it had sent to the client-side NN earlier, and the connection establishment phase of the packet flow may be completed. Subsequent packets in either direction may not include the tokens, and may use the path which bypasses the NFEIs. Note that along the path which includes NFEIs, multiple encapsulations may be performed in some embodiments, in which for example P1 is encapsulated within a first encapsulation packet EP1, EP1 is encapsulated within a second encapsulation packet EP2, etc., until eventually the receiving NM extracts the original packet originating at the CP (and provides it to the selected RH). Similarly, multiple encapsulation steps may be performed in the reverse path as well in some embodiments. In some embodiments, the encapsulation operations may use respective distinct encapsulation protocols.

In some embodiments, an NM (e.g., either the NM at the host at which the CP runs, the NM at the host at which the RH runs, or both NMs) may be implemented at least in part at on offloading card. The offloading card may be linked to the primary processors (e.g., CPUs) of the corresponding host via a peripheral interface (such as the Peripheral Component Interconnect-Express (PCIe) interface, or a Universal Serial Bus (USB) interface) in at least one implementation. As implied by the use of the term "offloading", the offloading card, which may comprise its own processors and memory, may be used to perform some of the tasks that would otherwise have been performed at the primary processors of the host, thereby freeing up more of the computation capacity of the primary processors for client-requested tasks or service implementation tasks.

In some embodiments, the path comprising multiple NFEIs may be used for establishing connectivity, and the path which bypasses or avoids the use of the NFEIs may be used for service requests and responses after connectivity has been established. In one embodiment in which the TCP (Transmission Control Protocol) is being used, for example, a message sent via the chain of NFEIs for connectivity establishment from the CP to the service may comprise a TCP SYN packet, and a message sent in response from the RH to the CP may comprise a TCP SYN-ACK packet. Other types of messages may be exchanged for connectivity establishment via protocols other than TCP. Any of a variety of network functions may be executed at individual NFEIs of the set of NFEIs configured between CPS and the network-accessible service in different embodiments, such as functions for routing traffic originating at an IVN to addresses outside the IVN, load balancing functions, network address translation functions, security or permission checking functions, and so on. In one embodiment, network functions executed at one or more of the NFEIs may comprise functions of a telecommunication application or service, such as an application implementing 5GNR (Fifth Generation New Radio) or other telecommunication technologies.

In some embodiments, as indicated earlier, CPs and/or RHs may be run at respective compute instances or virtual machines of a VCS. A given compute instance used for a CP and/or an RH may be migrated from one host to another in one such embodiment, e.g., by control plane components of the VCS for reasons such as balancing workload across hosts, planned maintenance events such as upgrades, and so on. Generally speaking, migration refers to moving compute instances (and/or other resources) between hosts in a cloud provider network, or between hosts outside of the cloud provider network and hosts within the cloud. There are different types of migration including live migration and reboot migration. Techniques for various types of migration involve managing the critical phase—the time when the compute instance is unavailable to the customer on whose behalf the compute instance is run—which should be kept as short as possible.

During a reboot migration, the customer experiences an outage and an effective power cycle of their virtual machine instance. For example, the VCS control plane can coordinate a reboot migration workflow in which a compute instance running on one host (the source host of the migration) is rebooted by being shut down on that host and booted up again on a new host (the destination host of the migration).

Live migration refers to the process of moving a running compute instance between different physical hosts without significantly disrupting the availability of the compute instance (e.g., the down time of the compute instance is not noticeable by the end user). When the VCS control plane initiates a live migration workflow, it can cause the creation of a new "inactive" virtualization domain associated with the instance on the destination host, while the original virtualization domain for the instance continues to run as the "active" domain on the source host. Memory (including any in-memory state of running applications), storage, and network connectivity information of the compute instance are transferred from the source host with the active domain to the destination host with the inactive domain. For example, a local migration manager running on the source host can send memory pages to the destination host (also referred to as the "state" of the instance), track changes to the memory pages, and continue sending the changed pages to the destination host. The instance may be briefly paused to prevent state changes while transferring a final set of memory contents to the destination host. Thereafter, one or more of the control plane, the local migration manager, and virtualization managers (including for example NMs as well as other components on the source and destination hosts) can transition the inactive domain to become the active domain and demote the original active domain to become the inactive domain (sometimes referred to as a "flip"). After this, the instance begins running on the destination host, and the inactive domain can be discarded.

In some embodiments, low-latency alternate paths of the kind described above for communications between a CP and an RH may continue to be used even after a compute instance at which the CP or the RH was running (when connectivity was established) is live migrated to some other host. For example, consider a case in which compute instance CI1 at which an RH RH1 is running is live migrated from host H1 (with NM NM1) to host H2 (with NM NM2). Connectivity may have been established, prior to the live migration, between the RH and a CP CP1 running at a CI CI2 of a host H3 (with NM NM3) using a set of NFEIs. In one embodiment, NM1 and/or NM2 may be notified by the VCS control plane regarding the live migration of CI1. NM1 and/or NM2 may in turn cause NM3 to update the rule it was using for bypassing NFEIs, such that traffic may flow between CP1 and RH1 via a path (different from the path which was being used for low-latency communication prior to the migration) which does not include the NFEIs. The path used for the communication to update the rule may not utilize the NFEIs in at least some embodiments. In one embodiment, the path used for the communication that results in the update of the rule may include one or more of the NFEIs. The updating of the rule may be considered part of the process of saving the networking state of the migrated CI CI1 in various embodiments. In some embodiments, the rule may be updated at NM3 based at least in part on communications from the VCS control plane, instead of or on addition to communications from the NMs at the hosts at which the RH runs. If/when the client-side CI CI2 is live migrated, the rule being used at the NM of the host at which the RH runs may be updated using a similar approach in various embodiments.

According to some embodiments, a system may comprise a plurality of RHs of a network-accessible service of a cloud provider network, a stateless load balancer (SLB), and a host external to the network-accessible service. The host may include an NM and a CP of the service. The SLB may be configured to select a particular RH from the plurality of RHs for processing a first message directed to the network-accessible service from the CP. The particular RH may be selected using an algorithm whose input includes (a) one or more properties of the first message and (b) configuration information of the network-accessible service, available at the SLB as of the time when the first message is received at the SLB in various embodiments. The configuration information of the service, which may change over time for various reasons, may include the number of RHs included in the plurality of RHs in some embodiments. For a given message provided as input to the algorithm, at least some types of changes to the configuration information provided as input to the algorithm may result in selection of different RHs. For example, if the number of RHs increases (e.g., due to automated establishment of additional RHs by the service's control pane based on detection of increased workload) or decreases (e.g., due to failures, or due to termination of execution of RHs based on a detected reduction in the workload), a different RH may typically be selected for the same client message than would be selected in the absence of the configuration change. In at least some embodiments, the load balancing algorithm may be probabilistic, and the probability of choosing a different RH may increase if/when the number of RHs change or there are other changes to the service configuration. The SLB may cause a first network connection of a first networking protocol (e.g., TCP) to be established between the CP and the particular RH which was selected using the algorithm. Flow state information of the first network connection, identifying a host at which the selected RH runs, may not be stored at the SLB in at least some embodiments. Note that the flow state information, which may be used to determine paths to be used for packets/messages within physical networks, may not necessarily include TCP connection state information (which may be maintained at the operating systems used at the hosts at which the CP and the RH run) in some embodiments.

The NM at the host at which the CP runs may be configured to obtain a rule which can be used to determine the result of the SLB's selection algorithm in various embodiments. In at least some embodiments, the rule may indicate identification information of the particular RH which was selected (e.g., including a physical network address of the host at which the RH runs). Flow state information pertaining to the connection established with the help of the SLB, including the identification information, may be stored (and updated as needed) by the NM in various embodiments. The flow state information may also include metadata indicating how recently a message was sent via the network connection, how many messages have been sent/ received at the NM using the network connection, and so on. Using the identification information and/or other elements of the flow state information, the NM may cause additional messages directed to the network-accessible service from the CP to be received at the particular RH without using the SLB as an intermediary. Such additional messages may be received at the RH in various embodiments regardless of whether the configuration information of the service has changed or not. For example, some such messages from the CP may be received at the particular RH during a time interval in which the configuration information of the network-accessible service has not changed relative to the configuration information which was used to select the particular RH using the algorithm, while other such messages may be received from the CP at the particular RH during another time interval in which the configuration information of the network-accessible service has changed relative to the configuration information which was used to select the particular RH using the algorithm. Such changes may include changes in the number of RHs configured and running at the service in some embodiments.

In at least some embodiments in which CPs and/or the RHs run at compute instances, the compute instance at which an RH or a CP runs may be live migrated, at some point after connectivity has been established between the RH and the CP using an SLB, to another host using a live migration workflow of the kind described above. In such live migration scenarios, the flow state information which was being used to send packets between the CP and the RH may be updated to reflect the migration, e.g., based on messages transmitted by NMs of the hosts involved in the migration to an NM of the host that is not being migrated as described above. Such messages which result in the update to the flow state information may also bypass the SLB in various embodiments. In one embodiment, the SLB may be used as an intermediary for the messages that result in the update of the flow state information. In some embodiments the flow state information may be updated based on messages transmitted by the VCS control plane. The updated flow state information (including updated identification information of the CP/RH whose compute instance was migrated) may then be used to send additional packets between the CP and the RH without using the SLB as an intermediary.

According to some embodiments, establishing the network connection may include exchanges of encapsulation protocol messages between the NM of the host at which the CP runs, and another NM at a host at which the particular RJH runs. A header of one of the encapsulation protocol messages may be used to transmit the rule and/or the identification information of the particular RH to the NM at the host used by the CP in such an embodiment.

In various embodiments, the SLB may itself comprise a plurality of nodes of a network function implementation service (NFIS) or packet processing service of the cloud provider network. Internal configuration changes of the SLB may also cause changes to the RH that is selected for a given CP message in such an embodiment; in effect, one of the inputs to the load balancing algorithm may comprise the current configuration of the SLB. For example, in one implementation a hashing algorithm and/or a shuffle sharding algorithm based on identification information of the CP may be used to select the particular NFIS node which is to be used for a CP message, and a different NFIS node may be selected if the number of NFIS nodes assigned to the service changes. The selection of a different NFIS node may in turn lead to the selection of a different RHs, for example in scenarios in which the probability of selection of a given RH is dependent on the NFIS node at which the load balancing algorithm is run. In embodiments in which the internal configuration of the SLB can change, the maintenance and use of the flow state information at the NMs may also result in the continued use of the same RH for a given CP's traffic, regardless of changes (if any) to the SLB configuration.

In some embodiments, the network-accessible service may provide metrics pertaining to the use of the alternate network paths between CPs and the service. For example, measurements of latencies achieved for various service requests and responses using the alternate paths may be collected, along with measurements of latencies achieved when using an NFEI chain. Respective sets of metrics pertaining to the transfers of messages using the two types of paths (paths in which the NFEI chain is bypassed, and paths in which the NFEI chain is not bypassed) may be provided in some embodiments via programmatic interfaces to customers on whose behalf the client programs are run. In some embodiments, messages which are transmitted using the alternate paths (which bypass or exclude NFEIs) may include bypass signals (e.g., tags or labels generated by the NMs and included in encapsulation packet headers) which enable the network-accessible service to distinguish them from messages which are transmitted via paths which include NFEIs. Such tags/labels may be used to perform operations such as gathering the metrics separately for bypass paths versus non-bypass paths in some embodiments, as the service may otherwise be unable to easily distinguish which type of path was used. Bypass signals may not be used for messages which are sent using the paths comprising the NFEI chain in at least some embodiments. In some embodiments, some RHs of a network-accessible service may not have associated NMs that can be used for the NFEI-bypassing techniques introduced herein. For such RHs, inbound and outbound traffic from/to CPs may be transmitted via the NFEI chains even after connectivity is established.

As mentioned above, the techniques introduced above may be implemented at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters its primary data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may also include edge locations in some embodiments, at which for example CPs and/or service components may be executed. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as a VCS extension resource group. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices, antennas or other telecommunication equipment, and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets.

The cloud provider network may implement various computing resources or network-accessible services, which may include a VCS, a radio-based application management service (RBAMS) for some types of telecommunication applications, data processing service(s) (e.g., map reduce, data flow, and/or other large scale data processing techniques), data storage services (e.g., database management services, object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a VCS or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). Such compute instances may be used for running CPs, and/or for service request handlers (RHs) in some embodiments. In one embodiment, each of the virtual compute instances may correspond to one of several instance types or families. An instance type may be characterized by its hardware type, computational resources (e.g., number, type, and configuration of central processing units [CPUs] or CPU cores, NFAs or other accelerators), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Containers and compute instances may both represent examples of program execution environments which may be used for CPs and/or components such as RHs of various network-accessible services. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. RBA components may be run using containers in at least some embodiments. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which, after connectivity has been established between client programs and a network-accessible service using messages transmitted via paths which include several network function execution intermediaries, subsequent traffic between the client programs and the service may be transmitted via alternate paths which do not include the intermediaries, according to at least some embodiments. In the depicted embodiment, CPs of a network-accessible service NS1 of system 100 may be run within a client-side virtual network (CVN) 110, while RHs of NS1 may be run within a separate virtual network 111. The term "client program," as used herein, refers to a program which sends requests for various types of tasks to a network-accessible service based on the requirements of a customer of the service, and receives responses to those requests (which may include results of the operations, indications as to whether the operations succeeded or not, etc.) from the network-accessible service. The virtual networks 110 and 111 may be set up at a VCS of a cloud provider network or cloud computing environment in at least some embodiments. In order to send the requests from a given CP and receive the corresponding responses, network connectivity may first have to be established between that CP and an RH in the depicted embodiment with the help of a set of network function execution intermediaries (NFEIs). The NFEIs may each be responsible for a respective task (referred to as a network function) that has to be performed for at least some packets or messages of a given flow of messages between the CP and the service, such as checking whether transmission of the packet is permitted by applicable security rules, selecting a particular route from a plurality of routes available for the packet, selecting a particular RH from the set of RHs of the targeted service, and so on. Internal configuration details of the target service and/or the NFEIs, which may be used to perform some of the tasks, may not be available at the client programs in at least some embodiments. For example, NS1 configuration metadata 152, which includes details such as the number of RHs configured within NS1, may not be known at the hosts at which CPs run.

In the scenario depicted in FIG. 1, CVN 110 may include CPs running at a plurality of hosts, and virtual network 111 may include RHs running at a plurality of hosts. For example, host 120A comprises CP 125A, host 120B comprises CP 125B, host 160A comprises RH 165A, and host 160B comprises RH 165B. Note that the hosts themselves may be configured in multi-tenant mode in some embodiments—e.g., a given host 120 may comprise execution environments such as compute instances or software containers run on behalf of several different users or organizations, and CPs (of NS1 and/or other services) may run within several of the execution environments. Similarly, multi-tenant RHs may be used in some embodiments, with a given RH being used for processing requests from several customers' CPs.

Each of the hosts in the embodiment depicted in FIG. 1 may include a respective NM, such as NM 130A at host 120A, NM 130B at host 120B, NM 130K at host 160A, and NM 130L at host 160B. An NM, which may in some embodiments be implemented as part of a virtualization manager, may act as an intermediary between a CP (and other programs running at the hosts) and the physical network components (such as network cables, etc.) used for transmitting traffic to/from the CPs. In some embodiments in which CPs run within compute instances, an NM may be implemented at least in part on an offloading card attached to the primary processor (e.g., CPUs) of the host via a peripheral interconnect. In various embodiments, compute instances within a virtual network such as CVN 110 or NS1's virtual network 111 may be assigned network addresses within address ranges of isolated virtual networks (IVNs), and the NM may be responsible for transmitting traffic whose packets include such IVN addresses as source or destination addresses over an underlying substrate network or physical network. An IVN may comprise a collection of networked resources (including, for example, compute instances) allocated to a given VCS customer, which are logically isolated from (and by default, inaccessible from) resources allocated for other customers in other isolated virtual networks. The customer on whose behalf an IVN is established (which could be an individual user, an organization, or a network-accessible service such as NS1) may be granted substantial flexibility regarding network configuration for the resources of the IVN—e.g., private IP addresses for application compute instances may be selected by the customer without having to consider the possibility that other resources within other IVNs may have been assigned the same IP addresses, subnets chosen by the customer may be established within the IVN, security rules may be set up by the customer for incoming and outgoing traffic with respect to the IVN, and so on. CVN configuration metadata 150 may include IVN configuration details such as the address ranges in use internally, subnet definitions, security rules and the like in some embodiments; such client-side configuration details may not be accessible or available at NS1.

In the example scenario shown in FIG. 1, three NFEIs may be used during the establishment of network connectivity between a CP 125B and NS1. NFEI 102 may execute a network function NF1, NFEI 103 may take the results of the execution of NF1 as input and execute another network function NF2, and NFEI 104 may in turn consume the results of NF2 as input and execute a third network function NF3. The execution of at least some of the NFs may require or use information that is not available, or cannot easily be obtained, at host 120B. The combination of NFEIs used may be referred to as an NFEI chain or an NFEI pipeline; while three NFEIs are shown in FIG. 1, in general any desired number of NFEIs may be used. As a result of execution of at least the combination of NFs NF1, NF2 and NF3, RH 165B may be chosen from among the set of RHs of NF1 as the endpoint within NS1 which is to be used for processing CP's traffic and requests. The baseline or default client-to-service packet path 161 for packets originating at CP 125B and directed to NS1 may thus comprise (in addition to CP 125B itself) NM 130B, NFEI 102, NFEI 103, NFEI 104, NM 130L and RH 165B. Note that the client-to-service packet path 161 is a logical path (a path between logical components of the system) rather than a physical path; the corresponding physical path may be more complex, depending for example on whether any of the NFEIs themselves comprise multiple nodes, dynamic routing decisions made in the network between host 120B and host 160B, and so on. Client-to-service packet path 161 may be used during connectivity establishment between CP 125B and NS1 (e.g., in response to a TCP SYN packet originating at CP 125B, with a destination address of NS1 obtained at CP 125B from a DNS server). Note that connectivity establishment may in general involve messages in both directions between a CP and an RH; the path in the reverse direction may originate at RH 165B and may include NM 130L, NFEI 104, NFEI 103, NFEI 102, NM 130B and CP 125B in that sequence in some cases. In some embodiments, the reverse direction logical path (the path from NS1 to the CP) may not necessarily include all the NFEIs that were used in the forward direction (the path from the CP to NS1), or the path in the reverse direction may include more NFEIs than the path in the forward direction.

As shown, the path between the CP 125B and the RH 165B selected for it may involve multiple hops in the depicted embodiment, at least during connection establishment. The NMs (at the hosts at which the CP and the selected RH run) and some or all of the NFEIs 102, 103 or 104 may participate in, or be compliant with, a rule preparation and propagation protocol (RPPP) 172 in the depicted embodiment, which enables subsequent packets between CP 125B and RH 165B to be sent by a path which can avoid some of the hops. This second path may bypass or avoid some or all of the NFEIs, and is labeled as alternate client-to-service packet path 162 in FIG. 1. In accordance with RPPP 172, the NM 130B at the client-side host 120B may obtain a set of rules 177 that enable a result of the combination of network functions NF1, NF2 and NF3 to be determined at the host 120B for additional packets that are to be transmitted to NS1 from the CP. In one simple implementation, a rule may simply indicate that for packets originating at CP 125B and directed to NS1 (as indicated by a DNS-server-supplied address of NS1), a physical network address of host 160B should be used as the destination address by the NM 130B. In some embodiments, rules 177 may be more complex—e.g., executable code or source code for implementing the rules may be obtained at the NM 130B. In some embodiments, the rules 177 may be obtained during the process of establishing connectivity, e.g., a rule may be indicated in a header of an encapsulation packet sent to the NM 130B during connectivity establishment, with the contents of the header being generated at one or more of the NFEIs. In other embodiments, the rules may be obtained after connectivity has been established. The NM 130L at the host at which the selected RH 165B runs may obtain its own set of rules 178, enabling packets to be sent to the CP from the RH via a path that does not include the NFEIs after connectivity has been established. Rules 177 and 178 may be referred to as alternate path selection algorithms in at least some embodiments. By eliminating NFEIs along the path used for messages between the CP and the selected RH, substantially lower request-response latencies may be achieved for tasks performed at NS1 at the request of CPs in the depicted embodiment. Note that the CPs and the RHs may not participate in (or even be aware of) the RPPP 172 in the depicted embodiment; no changes to CP or RH code may be required to benefit from the reduced latency of the alternate path 162.

As indicated above, the rules 177 may enable the NM 130B to obtain a result that matches the result that was obtained earlier from the sequence of network functions in the baseline client-to-service packet path in the embodiment depicted above. For example, if the final result of the sequence of network functions NF1, NF2 and NF3 indicates that a packet P1 of a packet flow directed to NS1 from CP 125B at some time T1 should be sent via NM 130L to RH 165B, invocation or execution of the rule may also indicate that additional packets P2, P3, . . . , from CP 125B to NS1 at respective times T2, T3, . . . , should also be sent via NM 130L to RH 165B. The decisions taken at the NFEIs during the transfer of packet P1 may in some cases differ from the decisions which would have been made if P1 had been sent at a different point in time. For example, the configuration of NS1 (such as the number of RHs configured) may change such that if P1 had arrived at a time (T1+delta1) or (T1−delta2), RH 165A may have been selected instead. In some embodiments, the NMs that obtain the rules may from time to time initiate operations to verify that the rule remains valid for determining the result of the NFs of the NFEI chain. Such verification operations may be initiated in response to a variety of triggering conditions (e.g., once every N seconds, or after every K packets have been set using the alternate paths indicated by the rules) in different implementations. In one embodiment, an NM such as 130B may generate synthetic packets which do not actually contain content generated at the CP 125B, but appear to contain content generated at CP 125B, and verify that the results obtained from the NFEI chain for such synthetic packets remains the same as the result being used for sending packets via the alternate path. In some embodiments, explicit verification operations may not be conducted; instead, for example, packets from CP 125B may simply be sent to NM 130L as long as responses to those packets continue to be received at NM 130B from NM 130L within a reasonable amount of time. Similar verification operations may be initiated in some embodiments by the NM 130L at the host 160B with respect to rules 178 for sending packets to CP 125B.

Figure 2:
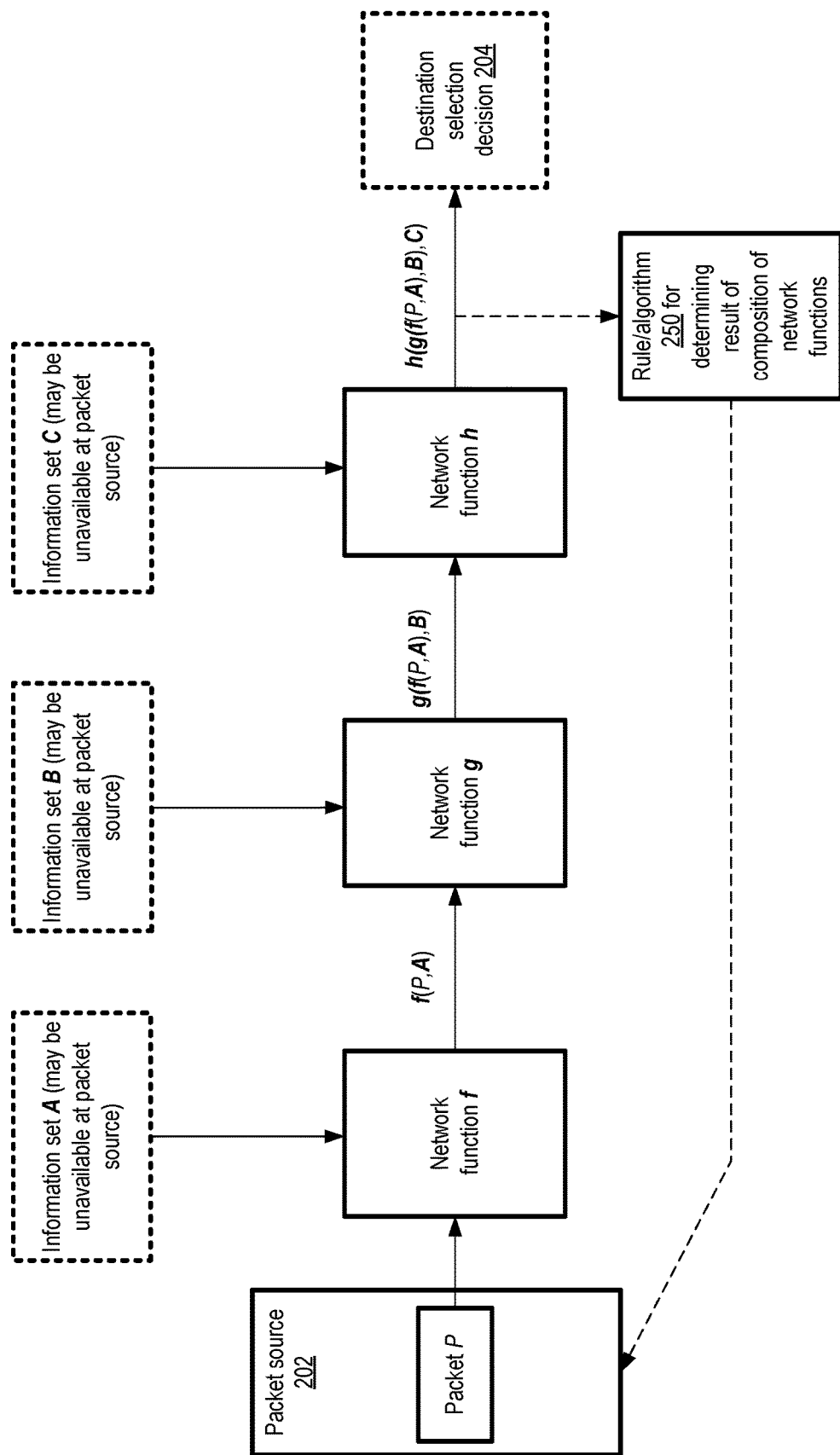
FIG. 2 illustrates an example conceptual framework for generating and propagating rules that can be used for bypassing arbitrarily long chains of network function execution intermediaries for traffic between a packet source and a destination, according to at least some embodiments.

FIG. 2 illustrates an example conceptual framework for generating and propagating rules that can be used for bypassing arbitrarily long chains of network function execution intermediaries for traffic between a packet source and a destination, according to at least some embodiments. In the example scenario shown in FIG. 2, a sequence of three network functions (f, g and h) is applied to a packet P originating at a packet source 202 (e.g., a host at which a CP runs) before a destination selection decision 204 (e.g., a selection of a particular RH from among a group of RHs) is made for P.

The input to f comprises not just the packet P, but also an information set A (at least part of which may be unavailable by design at packet source 202). Thus, the result of applying f to P may be expressed as f(P,A). This result may be consumed as input by network function g, along with another information set B, which may also not be available or accessible by design from the packet source 202. The result of applying g to the result of f may be expressed as g(f(P,A),B), which can be referred to as a composition of f and g. Similarly, the result of g may be part of the input of h, along with a third information set C, and the result obtained from h may be expressed mathematically as the composition h(g(f(P,A),B),C)of all three network functions. Information sets A, B and C may be time-varying—e.g., one of the information sets may pertain to internal configuration of an NFEI at a given point in time, another may comprise configuration information of an IVN used by a service, another may comprise network traffic measurements over a recent time interval, and so on. The final result of all the network functions compose together may result in the selection of a particular destination for P at a particular point in time in the depicted scenario. If such a result could be obtained at the packet source 202 itself, without re-architecting the system to enable information sets A, B and C to be accessed at the packet source 202, it may become possible to bypass the network functions f, g and h for subsequent packets.

Motivated by this logic, a rule or algorithm 250 for determining a result of the composition of network functions f, g and h may be generated in various embodiments, and propagated to packet source 202. That rule may then be utilized at the packet source (e.g., by an NM running at the host at which a CP runs) for transmitting subsequent packets to the destination without requiring execution of the network functions. Note that the default option of executing the chain of network functions remains viable—if desired, the packet source may use the longer path via the chain for some subsequent packets. While only three network functions are shown in FIG. 2 by way of example, similar reasoning may be applied to enable sequences of any number of network functions to be bypassed (e.g., a single network function, five network functions, or a hundred network functions).

Figure 3:
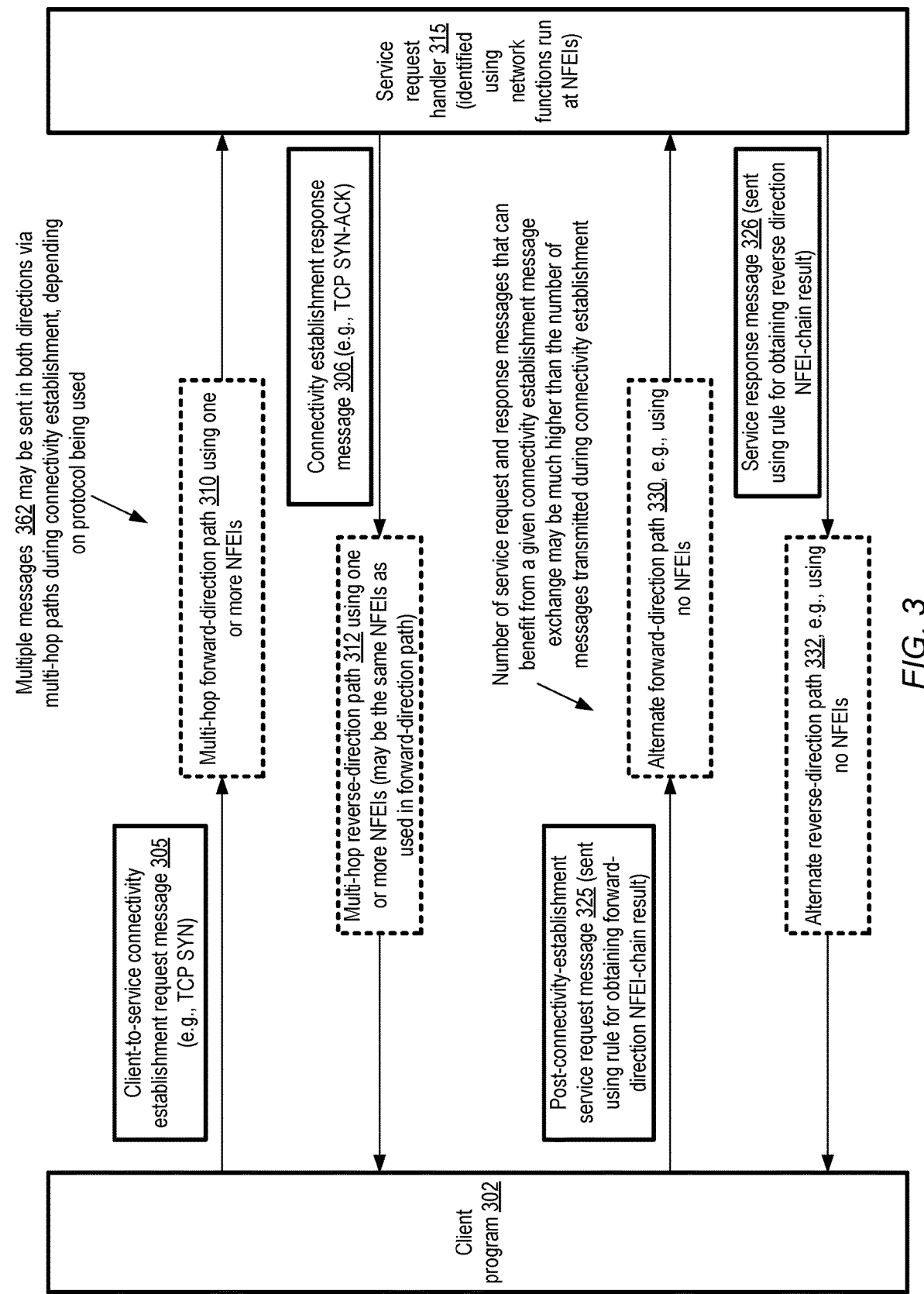
FIG. 3 illustrates examples of bi-directional exchanges of messages between a client and a service request handler using a first path during connectivity establishment and a second path after connectivity has been established, according to at least some embodiments.

FIG. 3 illustrates examples of bi-directional exchanges of messages between a client and a service request handler using a first path during connectivity establishment and a second path after connectivity has been established, according to at least some embodiments. A client-to-service connectivity establishment message 305, such as a TCP SYN packet in scenarios in which TCP is being used, may be sent from a client program 302 via a multi-hop forward-direction path 310 using one or more NFEIs to a service request handler 315 of a network-accessible service in the depicted embodiment. The client program may be implemented, for example, using a software development kit (SDK) of the network-accessible service, and/or using a set of APIs (application programming interfaces) published by the network-accessible service. A connectivity establishment response message 306, such as a TCP SYN-ACK message indicating that a connection request has been accepted or is in the process of being accepted, may be sent back to the client program 302 via a multi-hop reverse direction oath 312 using one or more NFEIs (which may in some cases include the same NFEIs that were used for the forward-direction path, but accessed in the reverse order) in the depicted embodiment. In some embodiments, multiple messages 362 may be sent in both directions via multi-hop paths during connectivity establishment, with the number of messages 362 that are required being dependent on the networking protocol or protocols being used.

After connectivity has been established, post-connectivity-establishment service request messages 325 (requesting various service business logic operations, for example) may be sent via an alternate forward-direction path 330 which does not include the NFEIs in the depicted embodiment. A rule obtained at a network manager associated with the client program may be used for such messages. The operations requested in a given service request may be performed at the network-accessible service of which the request handler is a component, and a service request message 326 may be sent back to the client program 302 via an alternate reverse-direction oath 332 which also may not include any NFEIs. Note that in some embodiments, the request handlers may not themselves implement the business logic of the service; instead, the request handlers may pass on the service requests to back-end nodes of the service at which at least some of the operations requested by client programs may be executed. The post-connectivity-establishment service request messages may be sent using a rule for determining the forward-direction NFEI chain result, and the service responses may be sent using another rule for determining the reverse-direction NFEI chain result in the depicted embodiment. For at least some applications, once connectivity has been established between a client program and a service request handler, numerous service requests may be sent using that same connection, so the number of connectivity establishment messages transmitted may be much lower than the number of service request and response messages that benefit from the connectivity establishment message exchange. For example, hundreds or thousands of service requests may be sent (using the alternate paths) via a connection whose establishment required two or three message transmissions (using the multi-hop paths).

In some embodiments, a secure communication session such as a TLS (Transport Layer Security) session may be established between the client program and the service request handler using the multi-hop paths in one or both directions. In other embodiments, secure session establishment messages may be exchanged via the alternate paths after an underlying TCP connection has been established using the multi-hop paths.

In one embodiment, the rule obtained at an NM for obtaining a result of an NFEI chain may not always identify the same service request handler. For example, executable code which mimics at least some of the logic executed at the NFEIs of the NFEI chain may be provided to an NM, and the results of the execution of that code may vary for different messages or packets originating at the client program and directed to the network-accessible service. In some embodiments, instead of executable code, source code may be transmitted to the NMs enabling them to replicate at least some of the tasks performed at the NFEIs, and an executable version of the source code may be generated at the NMs.

Figure 4:
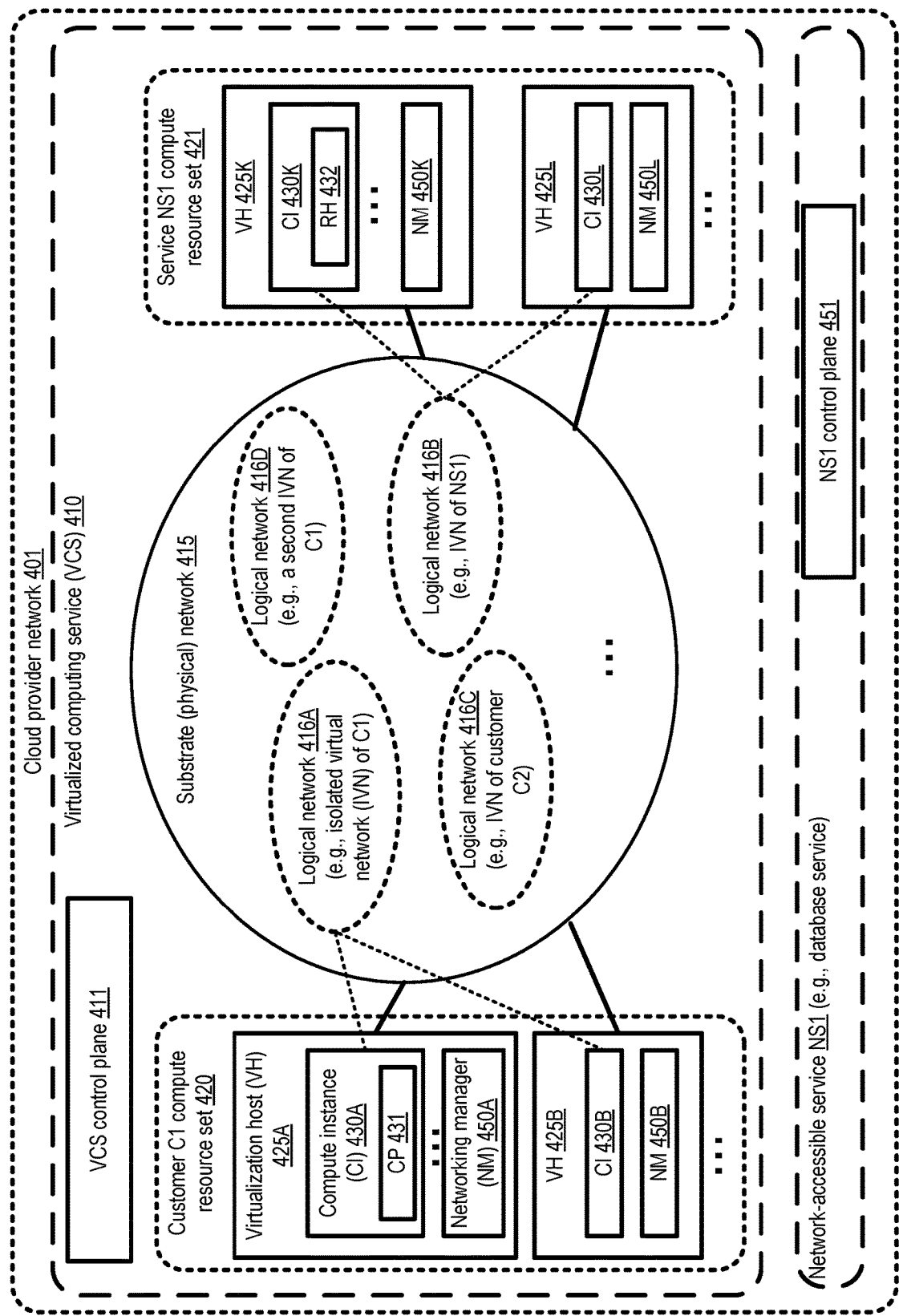
FIG. 4 illustrates example compute resource sets, as well as logical and physical networks, of a virtualized computing service which may be utilized for client programs and network-accessible services accessed by the client programs, according to at least some embodiments.

In some embodiments in which the client programs and/or service request handlers are run on virtualized execution environments (such as compute instances) with virtualized network addresses, alternate paths of the kind introduced above may use physical network address information provided to network managers in the rules. FIG. 4 illustrates example compute resource sets, as well as logical and physical networks, of a virtualized computing service which may be utilized for client programs and network-accessible services accessed by the client programs, according to at least some embodiments. In the embodiment depicted in FIG. 4, a cloud provider network 401 may include a virtualized computing service (VCS 410), as well as another network-accessible service NS1 such as a database service. The VCS may comprise a control plane 411 and a physical network, referred to as a substrate network 415, to which hardware servers used for compute instances as well as various other devices (such as at least some NFEIs) may be connected. The control plane 411 may comprise a set of nodes and metadata used for administrative operations of the VCS, such as provisioning hardware, monitoring the health of various components, responding to configuration change requests from customers, and so on. Service NS1 may comprise its own control plane 451, responsible for administrative tasks with respect to NS1 resources in the depicted embodiment. Utilizing the substrate network as underlying infrastructure, logical networks (referred to as overlay networks in some embodiments) may be configured in such embodiments on behalf of various VCS customers and/or on behalf of other network-accessible services such as NS1.

Logical network 416A may comprise a first isolated virtual network (IVN) of a customer C1 of the VCS in the depicted embodiment. Logical network 416D may comprise a second IVN of customer C1, logical network 416C may comprise another IVN set up on behalf of a different customer C2, and logical network 416B may comprise an IVN established for service NS1. Customer C1 compute resource set 420 may include a set of compute instances that are configured within logical network 416A and run at one or more virtualization hosts. For example, compute instance (CI) 430A may be launched at the request of customer C1, and may run at a virtualization host (VH) 425A selected by the VCS control plane. VH 425A may include an NM 450A. The customer's compute resource set 420 may include another CI 430B, run at VH 425B with NM 450B, with CI 430B also being configured within logical network 416A. The CIs of compute resource set 420 may be used to execute client programs (CPs) which utilize NS1 in the depicted embodiment; for example CI 430A comprise CP 431.

Service S1 compute resource set 421 may include CI 430K and CI 430L, both of which may be configured within logical network 416B. CI 430K and/or CI 430L may be used to execute request handlers (RHs) of NS1 in the depicted embodiment. For example, CI 430K may include RH 432. VH 425K may include an NM 450K, while VH 425L may include an NM 450L.

Messages between CPs (implemented at CIs of compute resource set 420) and NS1 RHs (implemented at CIs of compute resource set 421) may be formulated using logical network addresses as source and/or destination addresses, and may have to be transmitted across the substrate network by the NMs in order to reach their intended targets in the depicted embodiment. Connectivity between the CPs and the RHs may be established using chains of NFEIs of the kind described earlier, and rules which can be used to obtain the results of the NFEI chains may be obtained at the NMs to enable the NFEIs to be bypassed when transmitting messages in either direction. An NM at a host in the compute resource set 420 may obtain a rule which when executed indicates the substrate network address of the host at which a selected RH runs within compute resource set 421. Similarly, an NM at a host comprising the selected RH may obtain a rule which when executed indicates the substrate network address of the host at which the corresponding CP runs. Using the rules, messages between the client programs and the request handlers may be sent using point-to-point substrate network paths in some embodiments, without passing through NFEIs.

Figure 5:
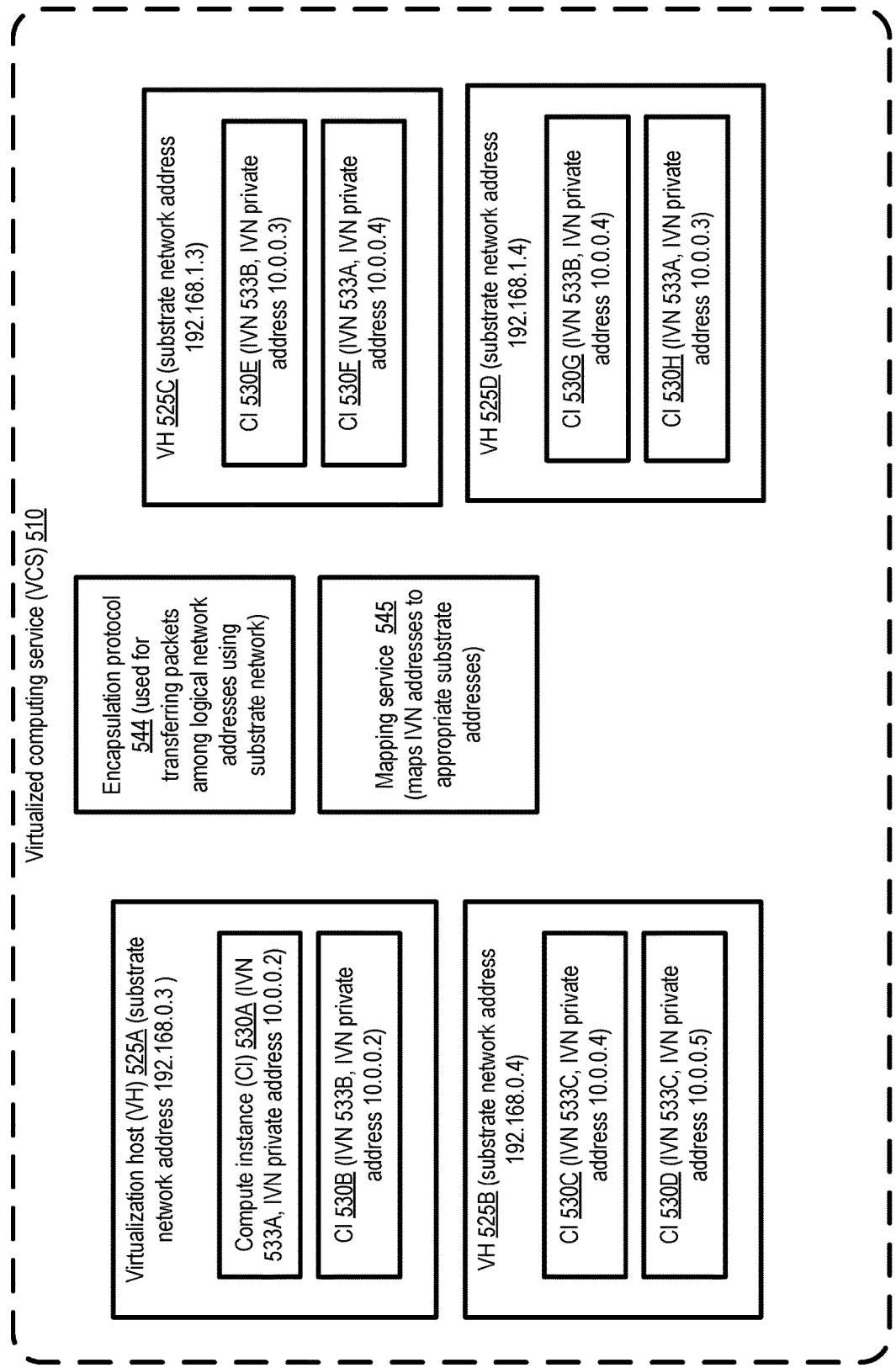
FIG. 5 illustrates example substrate network addresses which may be assigned to multi-tenant virtualization hosts of a virtualized computing service, and isolated virtual network addresses which may be assigned to compute instances running on the virtualization hosts, according to at least some embodiments.

FIG. 5 illustrates example substrate network addresses which may be assigned to multi-tenant virtualization hosts of a virtualized computing service, and isolated virtual network addresses which may be assigned to compute instances running on the virtualization hosts, according to at least some embodiments. The depicted scenario is presented to illustrate the kinds of networking-related operations that may have to be performed to enable traffic flows between compute instances set up within such logical networks, including compute instances that include CPs and service RHs of the kind introduced above. IP version 4 addresses are used by way of example in FIG. 5, although addresses formatted in accordance with other protocols such as IPv6 may be used in at least some embodiments. Note that the specific IP addresses shown in FIG. 5 are chosen as examples, and the techniques for bypassing NFEIs introduced earlier may be employed successfully regardless of the specific protocols or address ranged used.

In the depicted embodiment, four multi-tenant VHs 525A, 525B, 525C and 525D are shown. VHs 525 may each be connected to the substrate network of the VCS, e.g., via one or more Ethernet or similar cables linked to a top-of-rack switch configured within the substrate network. Each of the VHs 525A, 525B, 525C and 525D may be assigned a substrate network address in the depicted embodiment, such as 192.168.0.3 for VH 525A, 192.168.0.4 for VH 525B, 192.168.1.3 for VS 525C, and 192.168.1.4 for VH 525D. The substrate addresses for the VHs may for example be assigned by VCS control plane servers.

Compute instances launched at the virtualization servers may be assigned network addresses within isolated virtual networks in the depicted embodiment. For example, CIs 530A (at VH 525A), 530F (at VH 225C), and 530H (at VH 525D) may all be configured within the same IVN 533A, and assigned respective IVN private addresses 10.0.0.2, 10.0.0.4, and 10.0.0.3 respectively. Similarly, CIs 530B, 530E and 530G may be assigned IVN private addresses 10.0.0.2, 10.0.0.3 and 10.0.0.4 within IVN 533B, and CIs 530C and 530D may be assigned IVN private addresses 10.0.0.4 and 10.0.0.5 within IVN 533C in the depicted example. Note that because internal network configuration settings can be chosen independently at each IVN, address ranges used within IVNs for private addresses assigned to the CIs may overlap with one another—thus, CIs 530A and 530B have the same private address 10.0.0.2 within distinct IVNs (533A and 533B respectively). The within-IVN addresses may be deemed to be private in that they are not advertised or made accessible outside the IVNs, at least by default, in embodiments. In at least some embodiments, the private addresses may be assigned to virtual network interfaces, and the virtual network interfaces may be programmatically attached or associated to the compute instances. In at least some embodiments, in contrast, at least some of the substrate addresses may be assigned to physical network interface cards or NICs (or to NIC emulators), e.g., of the virtualization hosts. An NM at a given VH may be aware of the substrate address of the VH, as well as the IVN addresses assigned to CIs running at that host.

In order to transmit network packets that originate at one CI to another CI, at least three types of network information may have to be considered in the depicted embodiment: the IVN private addresses of the source and destination, the IVNs to which the sources and destinations belong, and the substrate addresses of the underlying virtualization servers. For example, a packet originating at CI 530A and destined for CI 530G may indicate its source (private) address as 10.0.0.2 and its destination address as 10.0.0.3. However, the packet may actually have to be transferred from substrate network address 192.168.0.3 to substrate network address 192.168.1.4 to reach its intended destination. An encapsulation protocol 544 (which is used to envelop or encapsulate packets associated with logical network sources/destinations within larger "augmented" packets associated with substrate network sources/destinations) and an associated mapping service 545 of the VCS may be used to accomplish this type of transfer in the depicted embodiment. In some embodiments, NMs and/or NFEIs of the kind described above may implement at least some of the encapsulation and decapsulation operations of the protocol, and utilize the mapping service 545 to determine the specific substrate address to which the packets included in such transfers should be sent. Note that in scenarios in which requests are to be sent from a CP running at a CI at one VH to a targeted network-accessible service whose RHs run on other CIs at other hosts, the specific RH that is going to respond to a request from the CP may not be known in advance at the CP; instead, the CP may use an IP address provided by a DNS server as the destination address for its request, and the particular RH may be identified by an NFEI not shown in FIG. 5.

In the above example, if a packet is to be sent from CI 530A to CI 530E, a determination may first be made, e.g., by an NFEI such as an IVN-to-IVN transit gateway, as to whether transfer of packets are permitted can be sent from IVN 533A to IVN 533B. If such transfers are permitted, the mapping service 545 may indicate (e.g., to an NM or an NFEI) that for IVN 533B, the destination private address 10.0.0.3 corresponds to the substrate address 192.168.1.3. The NM associated with VH 525A may generate an encapsulation packet which includes the original packet within it, has a substrate source address of 192.168.0.3, a substrate destination address of 192.168.1.3, and identifies IVN 533B as the IVN to which the packet is being transferred. At the receiving end, an NM running at the VH 525C may extract (de-capsulate) the original packet from the encapsulation packet, and provide it to the destination CI 530E. In some embodiments, to ensure that the packet is from a trusted/valid source, the NM at the targeted host may consult the mapping service to perform a reverse mapping (e.g., to identify the origin of the packet) before extracting the original packet. The mapping service 545 may thus provide security by preventing the opening of packets that are not validated. Similar encapsulation, mapping and security operations may be performed for packets being sent in the reverse direction.

Figure 6:
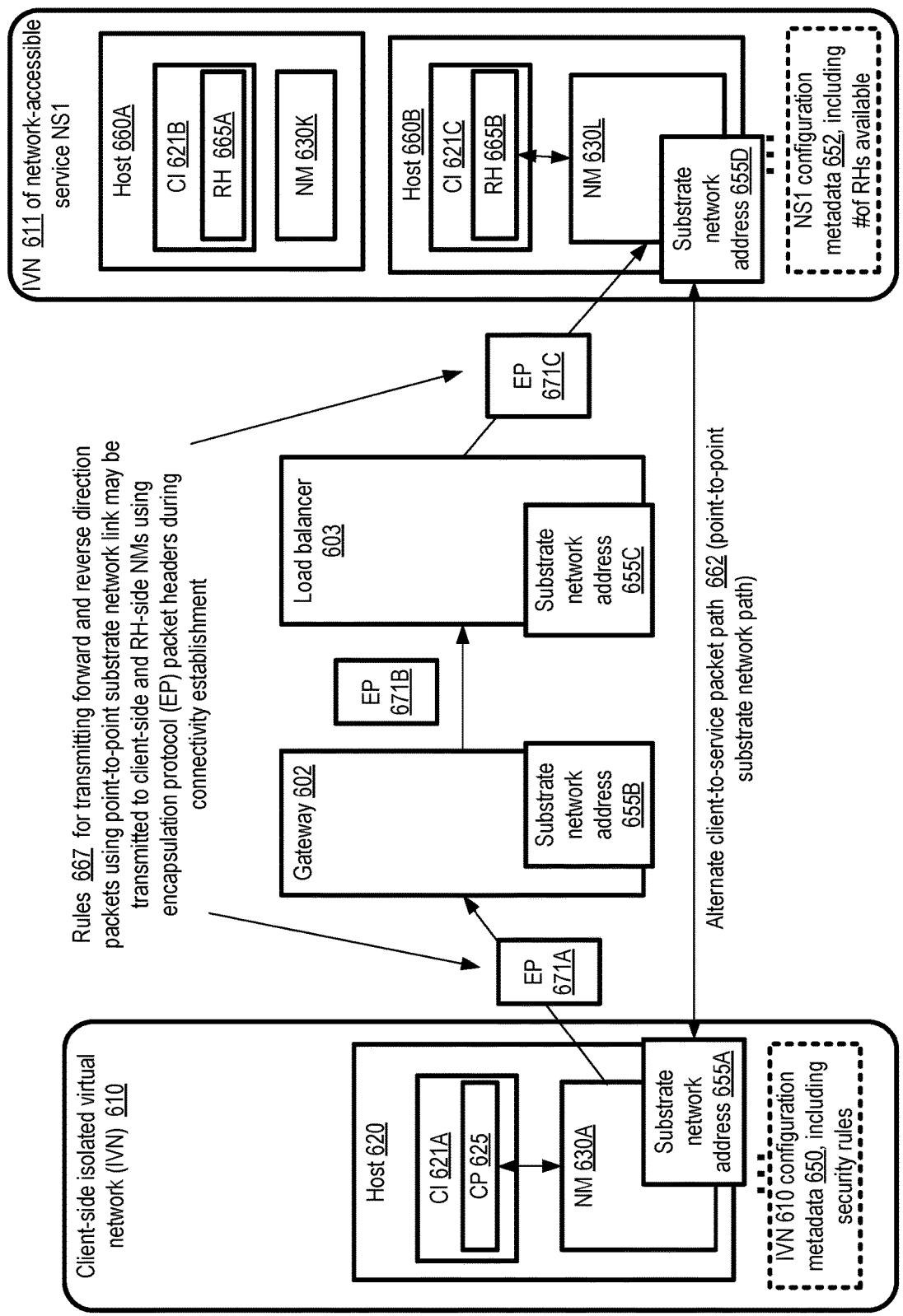
FIG. 6 illustrates an example use of substrate network paths for transmitting traffic between client programs and services without utilizing intermediaries, according to at least some embodiments.

FIG. 6 illustrates an example use of substrate network paths for transmitting traffic between client programs and services without utilizing intermediaries, according to at least some embodiments. In the scenario shown in FIG. 6, a CP 625 runs within a compute instance CI 621A at a host 620. The CI 621A is configured within a client-side IVN 610. Within IVN 611 of a network-accessible service NS1, RH 665A runs at CI 621B or host 660A, while RH 665B runs at CI 621C of host 660B. Host 620 includes NM 630A and has a substrate network address 655A assigned. NS1 may be accessible from the public Internet in the depicted embodiment; that is, requests may be sent from any public Internet address to a public Internet address assigned to NS1. Host 660A includes NM 630K, and host 660B includes NM 630L. Host 660B is assigned substrate network address 655D. IVN 610 configuration information 650, which may not be known within IVN 611, includes security rules indicating restrictions on outbound traffic from the CIs of IVN 610 (such as whether traffic to the public Internet is permitted from a given CI or not). NS1 configuration metadata 652, which may not be known in IVN 610, may include the number of RHs currently available at NS1.

To establish connectivity to NS1, CP 625 may obtain an IP address (an address accessible from the public Internet) for NS1 from a DNS server in the depicted embodiment, and send a connectivity establishment request packet using the NS1 public address as the destination address and CP's private IVN address as the source address. The connectivity establishment request packet may be included within an encapsulation packet (EP) 671A by NM 630A and sent to a gateway 602. EP 671A may have a substrate network address 655A as its source address, and substrate network address 655B of the gateway as a destination address. The gateway 602 may be an NFEI through which packets originating at private IVN addresses within IVN 610 have to pass if the packets are directed to a public Internet address such as the address obtained from DNS; the gateway may check the security rules of the IVN to ensure that packet transfers from CI 621A to the public Internet are permitted.

From gateway 602, another EP 671B (which also includes the original connectivity establishment request packet) may be sent to a load balancer 603 configured for traffic directed to NS1 in the depicted embodiment. EP 671B may have a source address 655B, and a destination address 655C (also within the substrate network of the VCS) assigned to the load balancer in the depicted embodiment. The load balancer (another NFEI in the chain of NFEIs used for connectivity establishment) may use current NS1 configuration metadata 652 as well as one or more properties of the connectivity establishment request from CP 625 as inputs to a load balancing function. The load balancing function may select one of the RHs of NS1 for the connectivity establishment request. In the example scenario shown in FIG. 6, RH 665B is selected, and an EP 671C containing the connectivity establishment request is sent from the load balancer to the substrate network address 655D of the host at which the selected RH runs. A response from the selected RH 665B, indicating that the connectivity establishment request has been accepted, may be sent back to the CP 625 via a path comprising the RFEIs (load balancer 603 and gateway 602) traversed in reverse order, also using encapsulation packets.

In the embodiment shown in FIG. 6, a header of EP 671C may include a rule 667 that can be used (after connectivity has been established) by NM 630L to send packets directly to NM 630A associated with CI 621A. A header of another EP received at NM 630A, comprising the response from RH 665B, may comprise another rule 667 that can be used by NM 630A to send packets directly to NM 630L associated with RH 665B. The alternate client-to-service packet path 662 may be a point-to-point substrate network path that does not pass through the NFEIs (the load balancer or the gateway) in the depicted embodiment. The rules 667 may be created by one or more of the NFEIs during the connectivity establishment workflow in the depicted embodiment.

Figure 7:
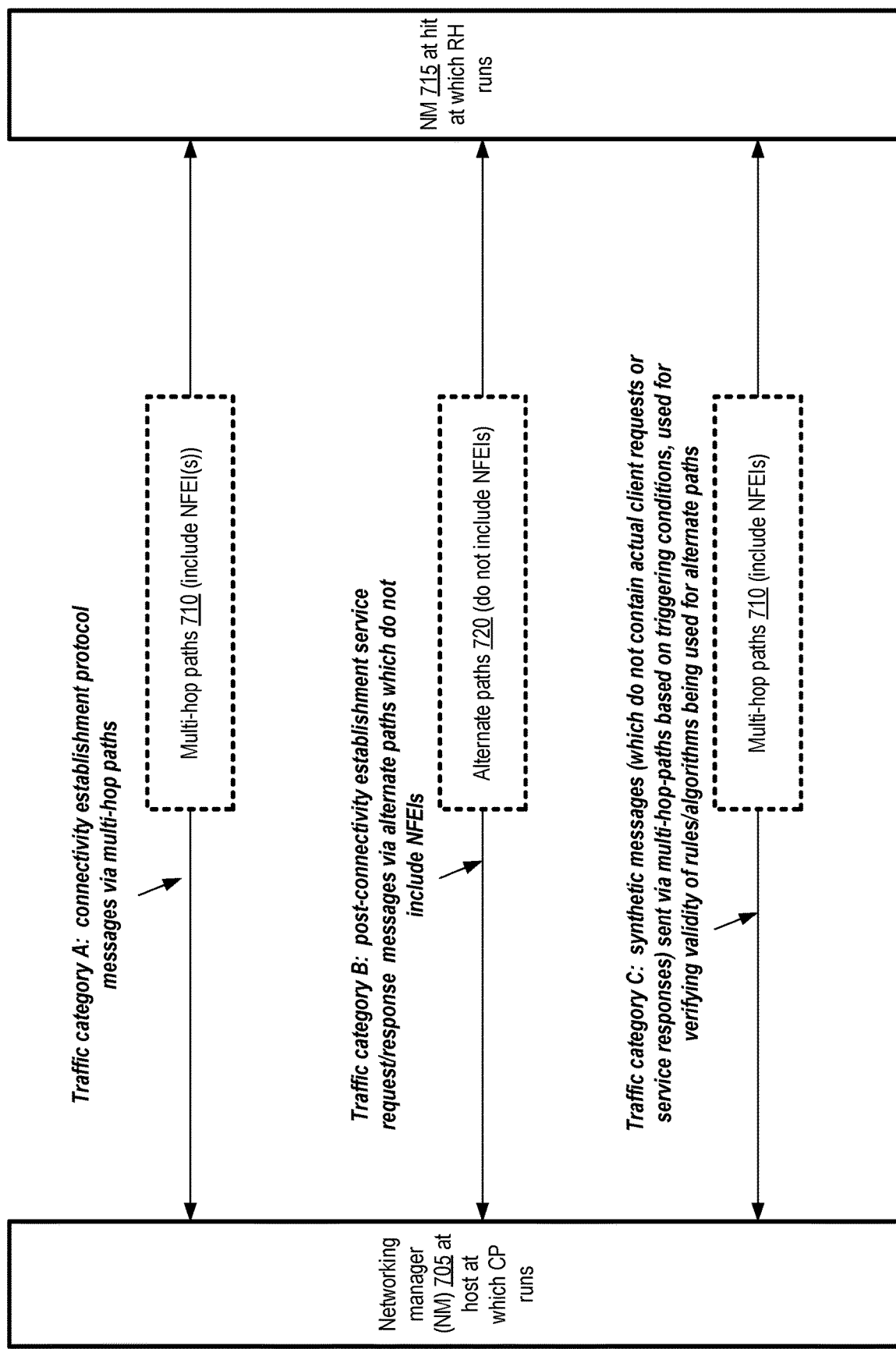
FIG. 7 illustrates an example use of synthetic messages for verifying the validity of rules or algorithms which are being used for sending service requests and responses via alternate paths, according to at least some embodiments.

FIG. 7 illustrates an example use of synthetic messages for verifying the validity of rules or algorithms which are being used for sending service requests and responses via alternate paths, according to at least some embodiments. In the embodiment depicted in FIG. 7, three categories of traffic may flow between a pair of NMs: an NM 705 of a host at which a CP of a service runs, and another NM 715 at the host at which a service RH selected to establish connectivity with the CP runs. The selected RH may be one of a set of RHs configured at a network-accessible service.

The first category, labeled traffic category A, may comprise messages of a connectivity establishment protocol or procedure. These messages may be sent in one or both directions via multi-hop paths 710, which each include one or more NFEIs in the depicted embodiment.

The second category, labeled traffic category B in FIG. 7, may comprise service requests (originating at the CP) sent after connectivity has been established, and corresponding response messages. Note that depending on the network-accessible service, some of the content of the responses may be generated at service nodes (e.g., back-end nodes used for business logic of the service) other than the RHs, but the RHs may nevertheless be used as the network endpoints of the service for sending the responses to the CPs from which the corresponding requests were received. Category B traffic may be sent via alternate paths 720 which do not include at least some of the NFEIs used for connectivity establishment in the depicted embodiment. Rules/algorithms whose execution results in the use of the alternate paths may be provided to the NMs 705 and 715 in various embodiments as discussed earlier.

A third category of traffic, labeled category C in FIG. 7, may comprise synthetic messages, generated at one or both NMs 705 and 715, to verify whether the rules used for traffic category B remain valid in the depicted embodiment. Such synthetic messages may be generated by the NM, and may not originate at the CP (in the case of the category C messages from NM 705 to NM 715) or the RH (in the case of the category C messages from NM 715 to NM 705). Category C messages may also be referred to as rule validation messages, and may be sent using an NFEI chain between the NMs, just as category A messages are sent in the depicted embodiment. In effect, the category C messages may mimic or simulate, at least partially, messages that could have originated at the CP or the RH, and may therefore be usable to check whether the earlier results obtained by the chain of NFEIs during connection establishment would still be obtained. The body or data portions of the synthetic packets may be filled with zeroes or other symbols selected at the NMs from which they are sent in various embodiments, while at least some of the header values may match the header values which may have been used for category A messages in some embodiments. In various embodiments in which the NMs generate encapsulation packets for messages of category A or category B, packets which appear to be encapsulation packets may be synthesized for rule validation (even though they may not truly encapsulate messages originating at a CP or an RH).

Category C messages may be transmitted based on any of a variety of triggering conditions in different embodiments. In one embodiment, for example, the triggering conditions may simply be the completion of a period of time (e.g., a rule validation message may be generated by an NM such as NM 705 once every T seconds). In another embodiment, the triggering condition may comprise determining that the number of service requests or responses that have been transmitted using the alternate path since the establishment of connectivity has exceeded a threshold, or that the number of service requests or responses that have been transmitted using the alternate path since the last time a rule validation message was sent exceeds a threshold. Other triggering conditions may be employed in other embodiments. In general, for many applications implemented using network-accessible services, the number of category B messages (sent using an optimized path which does not include the NFEIs) may far exceed the number of messages of category A or category C, so the benefits of lowering latency bypassing the NFEIs may be experienced by the vast majority of messages.

Figure 8:
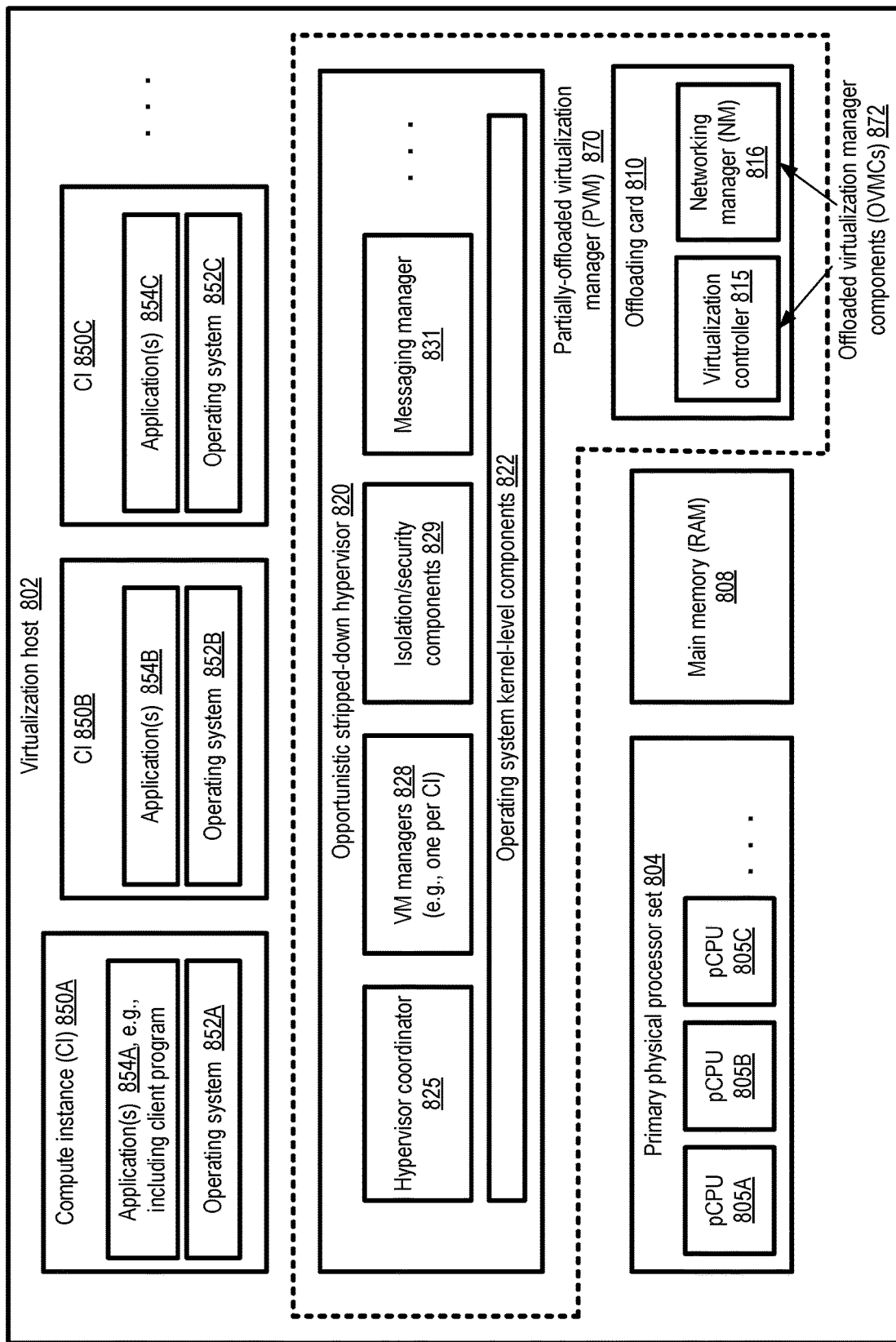
FIG. 8 illustrates example components of a multi-tenant virtualization host, including a networking manager at an offloading card, which may be employed for client programs, according to at least some embodiments.

An NM associated with a host at which a CP or an RH runs may be implemented using a variety of techniques in different embodiments. FIG. 8 illustrates example components of a multi-tenant virtualization host, including a networking manager at an offloading card, which may be employed for client programs, according to at least some embodiments. As shown, a virtualization host 802 may comprise a primary physical processor set 804, a main memory (e.g., one or more modules of random access memory or RAM) 808, a partially-offloaded virtualization manager (PVM) 870 and zero or more compute instances (CIs) 850, such as CIs 850A-850C. (Virtualization host 802 may also comprise a number of other components, e.g., various persistent storage devices, which are not shown in FIG. 8 to avoid clutter.) The primary physical processor set 804 may comprise a number of physical CPUs (pCPUs), including pCPUs 805A-805C in the depicted embodiment. Virtualized versions of the pCPUs, called vCPUs or virtual CPUs, may be allocated to individual CIs by the PVM 870 during the lifetime of the CIs. Each CI 850 may comprise a respective instance of an operating system (e.g., operating systems 852A-852C) and a set of applications (e.g., 854A-854C) being run on behalf of customers of the virtualized computing service. Some applications such as applications 854A may include a client program which communicates with a network-accessible service. Request handlers of the service may also be implemented at CIs of virtualization hosts similar to VH 802 in some embodiments.

The PVM 870 may comprise an opportunistic stripped-down hypervisor 820 (which uses the pCPUs) and one or more offloaded virtualization manager components (OVMCs) 872 which do not use the pCPUs in the depicted embodiment. OVMCs 872 may include, for example, a virtualization controller 815 and an NM 816 with features and functionality similar to those of NMs discussed earlier. The NM 816 may also be referred to as a network processing offloader or a networking virtualization manager. Individual ones of the OVMCs may be implemented using a respective system-on-chip design in some embodiments. Although both OVMCs 872 are shown as being incorporated within a single offloading card 810 (e.g., a card linked to the primary physical processors using PCIe, USB or a similar peripheral interconnect) in the depicted embodiment, other approaches regarding the arrangement and organization of the OVMCs may be employed in different embodiments. For example, in one embodiment, a single system-on-chip implementation may be used to perform the functions of the virtualization controller and the NM, thereby eliminating the need for two different OVMCs. In another embodiment, respective offloading cards may be used for the virtualization controller 815 and the NM 816. The virtualization controller, as suggested by its name, may be responsible for organizing or orchestrating much of the virtualization management work performed at the host 802 in the depicted embodiment—e.g., it may be the first of the components of the PVM to boot, trigger the launches of the other components of the PVM, communicate with the control plane of the VCS within which the VH is configured, make memory allocation decisions with respect to compute instances, and so on.

Hypervisor 820 may be described as being stripped-down in the depicted embodiment because much of the work performed by at least some conventional hypervisors may be handled by the OVMCs 872 instead, thereby reducing the complexity and size of the hypervisor 820. In addition, hypervisor 820 may be designated as opportunistic because, under most circumstances, it may wait until a CI voluntarily relinquishes control of a pCPU 805 before the hypervisor uses CPU cycles. Thus, for example, when a particular CI 850 issues an I/O request (where the I/O is expected to take approximately time T1 to complete) and gives up a pCPU until a response to the I/O request is received, the hypervisor may make use of this opportunity to use the pCPU to perform one or more virtualization management tasks (which may typically take time T2, where $T2 \ll T1$) while the CI is not expecting to use the pCPU. As such, the hypervisor 820 may have a minimal impact on the performance of applications 854 in the depicted embodiment.

The hypervisor 820 may itself comprise a number of subcomponents in the depicted embodiment, including a set of operating system kernel-level components 822, a hypervisor coordinator 825, one or more VM (virtual machine) managers 828, isolation/security components 829, and/or a messaging manager 831. The hypervisor coordinator 825, individual ones of the VM managers 828, the isolation/security components 829 and/or the messaging manager 831 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by CIs, etc.). In some implementations, for example, several of the hypervisor subcomponents may typically remain blocked on a polling system call (such as epoll( ) or the equivalent) most of the time.

The kernel-level components 822 may provide support for various low-level operations such as the initial responses to VM exit instructions issued by the CIs (e.g., when a CI gives up a pCPU). The hypervisor coordinator 825, as implied by the name, may be responsible for orchestrating operations of the other subcomponents. The hypervisor coordinator 825 may, for example, implement an API which can be used for communications between the OVMCs 872 and the hypervisor, initiating CI launches and terminations (e.g., at the request of an OVMC), exposing metrics collected by the VM managers, providing debugging capabilities, and so on. Each VM manager 828 may be responsible for launching or instantiating a respective CI based on a specification provided by the coordinator 825, monitoring metrics and logs of the CI, and so on. In some embodiments there may be a 1-to-1 mapping between VM managers and CIs, while in other embodiments a single VM manager may be responsible for multiple CIs. The messaging manager 831 may act as an intermediary between the virtualization controller 815 and the hypervisor, e.g., by translating commands issued using a queue-based protocol by the virtualization controller into pipe messages within the hypervisor. The security and isolation components 829 may be responsible, for example, for scrubbing or cleaning up CI memory when a CI terminates, so that inadvertent sharing of data across CIs can be avoided. It is noted that the PVM may comprise additional components (not shown in FIG. 8) in at least some embodiments, while in at least one embodiment one or more of the PVM components shown in FIG. 8 may not be required.

Figure 9:
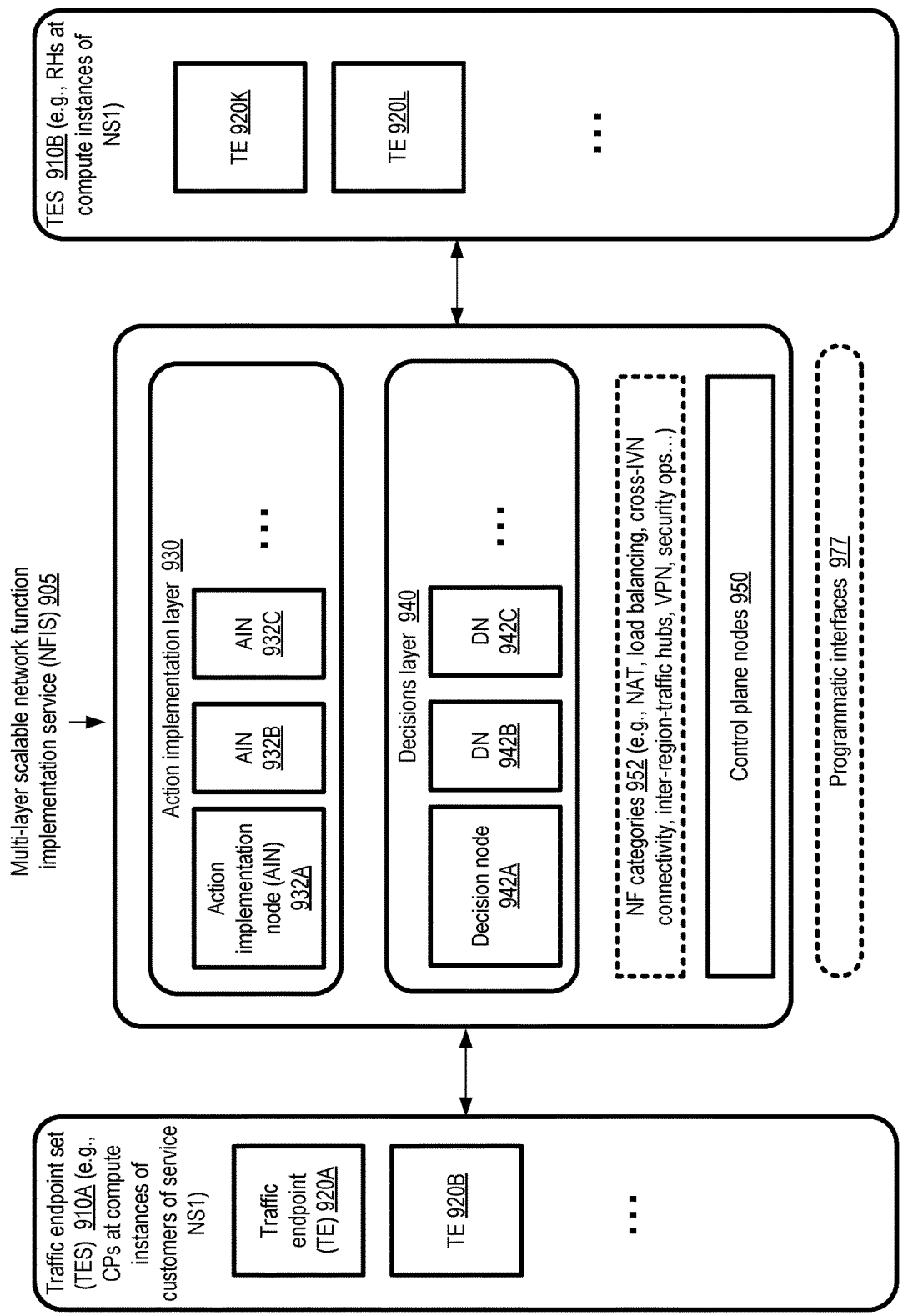
FIG. 9 illustrates example components of a network function implementation service which may be employed for a variety of network functions used for traffic between client programs and other network-accessible services, according to at least some embodiments.

In some embodiments, individual ones of the NFEIs of the kind discussed earlier may be implemented using a distributed architecture. FIG. 9 illustrates example components of a network function implementation service which may be employed for a variety of network functions used for traffic between client programs and other network-accessible services, according to at least some embodiments. Multi-layer scalable network function implementation service (NFIS) 905 may utilize resources of a cloud provider network in various embodiments, and may be used to perform a variety of NFs on behalf of numerous customers (e.g., individuals or organizations outside the provider network, or other services implemented at the provider network which may utilize the NFIS). NF categories 952 supported by NFIS 905 may include, among others, network address translations (NAT), load balancing, cross-IVN connectivity (connectivity between IVNs with their own independently selected internal configuration settings, including potentially overlapping private address ranges), inter-region-traffic hubs linking networks implemented at geographically dispersed data centers of the provider network, various types of network security operations, and so on. The NFIS may also be referred to as a packet processing service, a software-defined networking (SDN) service, or a flow management service.

Generally speaking, the NFIS may receive network packets from one or more traffic endpoint sets (TESs), perform one or more network functions with respect to any received packet, and cause one or more packets corresponding to the received packet to be delivered to another set of one or more TESs. In FIG. 9, TES 910A may, for example, comprise CPs at compute instances of customers of a network-accessible service NS1, while TES 910B may comprise RHs at compute instances set up for NS1. TES 910A may include TE 920A and TE 920B, while TES 910B may include TE 920K and TE 920L.

The NFIS may classify a given received packet as a member of a particular network flow, identify the specific network functions that are to be applied to packets of that flow, generate one or more output packets based on the network functions, and transmit the output packets to one or more destinations (where the destinations may in some case have been selected based on the NFs. The same NF may be applied consistently for multiple packets belonging to the same flow in at least some embodiment. In at least some embodiments, one network flow may be distinguished from another based on some or all of the following attributes: a networking protocol indicated in a received packet, a source network address (e.g., an Internet Protocol (IP) associated with a source TE at which the packet originated), a source network port, a destination network address (e.g., another IP address), a destination network port, and/or a directionality indicator with respect to an application for which the network functions are required (e.g., whether the packets are directed to the NFIS from client-side components of the application, or server-side components of the application).

The logic to be used for a given NF implemented by the NFIS may be indicated in a request from a customer of the NFIS in various embodiments. For example, a customer may utilize programmatic interfaces 977 (e.g., a set of APIs (application programming interfaces), command line tools, a web based console, or a graphical user interface) indicating the NFs that are needed, the sets of entities or addresses from which the packets are to be sent to the NFIS, the sets of entities or addresses to which the NFIS is expected to send output packets, the expected bandwidth needs in one or both directions of traffic, and/or various other characteristics of the NF requirement. The customer requests regarding the NF requirements may be processed by control plane nodes 950, which may then assign or allocate data plane resources at one or more layers of the NFIS to each customer. In at least some embodiments, the NFs may be implemented at layers 3 (the network layer) and/or 4 (the transport layer) of the open systems interconnect (OSI) model for networking.

In various embodiments, the NFIS may be implemented as a distributed system comprising several different logical and/or physical layers of nodes. One layer, called the action implementation layer 930, may be responsible largely for actions that apply the NFs on received packets, and sending the results of the NFs to the appropriate destinations. In the embodiment depicted in FIG. 9, action implementation layer 930 includes action implementation nodes (AINs) 932A, 932B and 932C. Another layer, called the decisions layer 940, may be largely responsible for generating (e.g., in executable form) the detailed actions which are to be taken at the action implementation layer to fulfill various customer packet processing requirements. Decisions layer 940 may include decision nodes (DNs) 942A, 942B, and 942C in the depicted embodiment. A detailed action may be determined at a DN based on various factors in different embodiments— e.g., information maintained at the decisions layer regarding the workload or availability of different destination TEs, indications or records of customer requirements, and so on. The detailed actions may be cached at the AINs for re-use on multiple packets of each flow, so that for most packets of a given flow, the decision layer nodes do not have to be consulted or used. In some embodiments, the NFIS may include another layer, called the flow state tracking layer, largely responsible for maintaining state metadata regarding various flows, e.g., information about the rates at which packets are being processed, how long ago the most recent packet of a given flow was processed, and so on.

Each of the layers may comprise numerous nodes in some embodiments, with each node configured to interact with one or more nodes at other layers and/or at its own layer. In some embodiments, some or all the nodes at one or more of the layers may be implemented at respective compute instances of a VCS running at hosts connected to the VCS substrate network, while in other embodiments, at least some nodes at some layers may comprise un-virtualized hosts. In some embodiments multiple nodes of one or more layers may be implemented on the same host. In various embodiments, for a given flow or for a given NF requirement, at least two nodes may be assigned at a given NFIS layer—e.g., a primary node, and a secondary node configured to take over the responsibilities of the primary node under certain conditions. The executable actions, and/or the information required to identify the particular actions to be applied to a given flow, may be replicated in at least some embodiments, such that the NFIS is able to withstand at least some types of failures at any of the layers. A number of techniques such as customer-based partitioning, shuffle-sharding and/or flow hashing may be used to select the particular node or nodes at each layer of the NFIS which should process a new flow.

In at least some embodiments, one or more of the NFEIs of the kind introduced in FIG. 1 may be implemented using multiple nodes of the NFIS. Furthermore, in at least one embodiment, the results obtained at such an NFEI for a given NF may be dependent on the internal configuration of the NFEI—e.g., on how many (and/or which specific) AINs are assigned currently to the NFEI, how many (and/or which specific) DNs are currently assigned, and so on. In at least some embodiments, the internal configuration of a given NFEI implemented at the NFIS may be modified by control plane nodes 950, e.g., based on metrics of workload levels of the NFIS AINs or DNs currently assigned to the NFEI, based on resource utilization levels of the compute instances used for the NFIS nodes, based on failures of the assigned NFIS nodes, and so on.

In many cases, new functionality (such as additional security requirements for some or all packets transferred, enhancements to encapsulation protocols, etc.) may be added over time for communication between client programs and network-accessible services. Such additional function may require the use of additional NFEIs in some cases. FIG. 10 and FIG. 11 illustrate example scenarios in which additional network function execution intermediaries may be introduced into a chain of intermediaries set up between clients and a service, according to at least some embodiments. In the depicted embodiment, individual ones of NFEIs used for a given network-accessible service may be designed at different points in time as new functionality enhancements are approved. In scenario A of FIG. 10, during some time period two NFEIs may be utilized for connectivity establishment between a client program and a network-accessible service. Both NFEIs may participate in, or comply with, an NFEI-bypassing rule preparation and propagation protocol 1072 in example scenario A. During connectivity establishment, the path used for communicating between the CP and the service may include a client-side NM 1002, RPPP-participant NFEI 1014A, RPPP-participant NFEI 1014B and a service-side NM 1004. In accordance with RPPP 1072, a rule R1 may be prepared (at least in part at one or both of the NFEIs 1004A or 1004B) for bypassing the RFEIs when sending subsequent messages from the CP to the service, and another rule R2 may be prepared (at least in part at one or both of the NFEIs 1014A or 1014B) for bypassing the RFEIs when sending subsequent messages from the service to the CP. R1 may be propagated to client-side NM 1002, and R2 may be propagated to service-side NM 1004. An alternate path (which does not include the NFEIs, and may comprise a point-to-point or direct substrate network link between the NMs) may be identified using R1 and R2 for the subsequent packets sent in both directions, and used instead of a path which includes both RFEIs 1014A and RFEI 1014B.

At some later point in time, administrators of the service and/or administrators of the hosts at which the CP runs may decide that another NFEI 1014C, which performs a packet processing task which was not being performed earlier, is to be added to the chain of NFEIs in the embodiment shown in FIG. 10. NFEI 1014C may be inserted between NFEI 1014A and 1014B, so that the client-to-service or forward direction path during connection establishment is to include NFEI 1014A, NFEI 1014C and NFEI 1014B in that sequence. Scenario B shows the case in which NFEI 1014C is also designed to participate in or be compliant with the RPPP. New rules R1' and R2' may be generated and propagated to NM 1002 and NM 1004 respectively if needed, and all three RPPP-compliant NFEIs may be bypassed for client-service interactions after connectivity is established via the 3-NFEI path. As a result, despite the introduction of another RFEI, similar latency reductions may be obtained in Scenario B as in Scenario A. Note that at least in some embodiments, existing connections between a CP and a service may have to be torn down if/when an NFEI is added to the chain, and connectivity may have to be re-established in such cases.

In some cases, a new NFEI may have to process each packet that is sent between a CP and a targeted service even after connectivity is established (which makes bypassing the new NFEI infeasible), or may not be designed to participate in the RPPP for some other reason. For example, for some applications, deep packet inspection may be performed at the added NFEI, so the contents of each packet may be examined by that NFEI. Such NFEIs, which cannot be bypassed by most or all packets between a CP and the service, may be referred to as a non-bypassable NFEI or an RPPP-nonparticipant NFEI.

This type of situation is depicted in scenario C of FIG. 11. A non-bypassable NFEI 1104 may be added between a pair of RPPP-participant NFEIs 1014A and 1014B that are utilized for traffic between a CP and a network-accessible service. Latency improvements of the kind described above may still be achieved in some cases, even after the introduction of the non-participant NFEI, if for example the new NFEI 1104 also has an associated NM 1105 with similar capabilities as the client-side NM and the service-side NM. In such a scenario, the alternate path used for messages sent post-connectivity establishment may include the new NFEI 1104, but may bypass the other NFEIs 1014A and 1014B. During connectivity establishment, all 3 NFEIs 1014A, 1104 and 1014B may be used for packets flowing in both directions in the depicted embodiment. Rule R3 may be used by the client-side NM 1002 to send messages to the NM 1105 of NFEI 1104 after connectivity is established, bypassing NFEI 1014A. Rule R4 may be used by NM 1105 to send messages originating at the service to the client-side NM 1002 after connectivity, also bypassing NFEI 1014A. Another rule R5 may be used by NM 1105 to send messages to service-side NM 1004 after connectivity is established, bypassing NFEI 1014B. Rule R6 may be used by NM 1004 to send messages originating at the service to NM 1002, also bypassing NFEI 1014B.

In addition to helping to reduce latency for client-service traffic, the rule-based NFEI bypassing techniques of the kind introduced above may help enable simplification and increase robustness of one or more types of NFEIs in some embodiments. For example, instead of deploying stateful load balancers, which may each have to store flow state information (including the identity of the RH selected for each connection from each CP) for large numbers of packet flows being managed stateless load balancers may be deployed for selecting target RHs, while still achieving the consistency advantages of stateful load balancing. In stateful load balancing, multiple service requests from a given CP can be sent to the same load balanced target RH, which in turn can lead to affinity-related performance benefits (for example, the target RH can maintain a cache containing application-level information that can be re-used to respond to multiple requests from the same CP). Responsibility for maintaining flow state information may in effect be delegated to the NMs at the client side and the service side, e.g., as part of a rule or algorithm that is generated and propagated as described earlier to the NMs. Stateless load balancers, which do not have to store and maintain flow state information, may be simpler to implement, faster in making load balancing decisions, and more resilient to failure (for example, because saving flow state information across failures of the load balancer may not be needed) than stateful load balancers.

Figure 12:
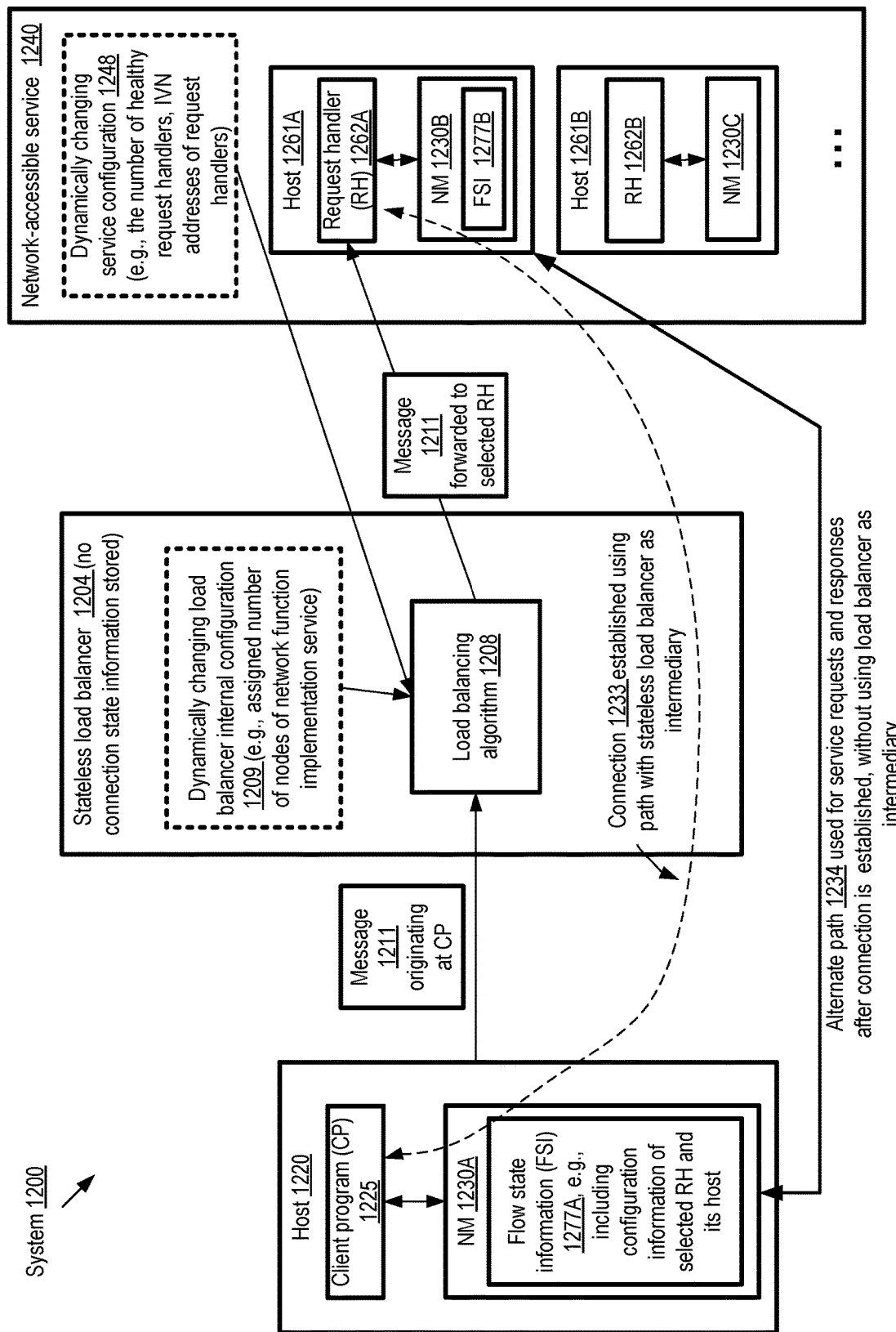
FIG. 12 illustrates an example system environment in which a stateless load balancer may be employed to set up stateful load-balanced connections with a network-accessible service, according to at least some embodiments.

FIG. 12 illustrates an example system environment in which a stateless load balancer may be employed to set up stateful load-balanced connections with a network-accessible service, according to at least some embodiments. As shown, system 1200 comprises metadata and resources of a network-accessible service 1240, such as a database service or an object storage service which may be implemented at a cloud computing environment, a stateless load balancer (SLB) 1204, and a host 1220 external to the service. The host 1220 may comprise a CP 1225 from which service requests are to be directed to the network-accessible service 1240, as well as an NM 1230A. The network-accessible service 1240 may include numerous RHs for processing the requests from various client programs, such as RH 1262A at host 1261A, RH 1262B at host 1261B, and so on. At least some of the hosts used for the RHs may include NMs, such as NM 1230B at host 1261A and NM 1230C at host 1261B. The configuration of the service may change dynamically in the depicted embodiment—e.g., more RHs may be added as the workload increases, RHs may be migrated from one host to another, network addresses assigned to the RHs or to the hosts at which the RHs run may be changed, and so on.

A load balancing algorithm 1208 may be implemented at the stateless load balancer to select a particular RH for processing at least a first message (such as a connection establishment message) directed from the CP 1225 to the network-accessible service 1240 in the depicted embodiment. Input to the load balancing algorithm may include one or more properties of the message, as well as the current configuration information of the network-accessible service available at the in various embodiments. The dynamically changing service configuration 1248 may for example include the current number of healthy or responsive RHs, the hosts at which the RHs are running, the private IVN addresses of the RHs (in embodiments in which the RHs are configured within an IVN established for the service), the substrate network addresses of the hosts used for the RHs (in embodiments in which the RHs are configured at hosts configured within a substrate network of a VCS), and so on. Output of the load balancing algorithm may include identification information of the selected RH (e.g., an RH identifier and/or associated network addresses).The load balancer 1204 may not store flow state information about message flows that use connections established as a result of execution of the load balancing algorithm in the depicted embodiment, including identity information of the selected RHs such as the substrate and/or IVN addresses that can be used to reach the RH selected for a given CP. Changes to at least some of the service configuration settings, such as increases or decreases in the number of RHs configured, may lead to changes in the output of the load balancing algorithm. For example, given a particular set of configuration settings CS1, RH 1262A may be selected for a message from CP 1225, but if the configuration settings change to CS2, a different RH such as 1262B may be selected if the identical message were received from CP 1225. In at least some embodiments, the load balancing algorithm may be probabilistic in nature, and changes to the input service configuration information may lead to changes in the probability of selection of individual RH. For example, consider a simple scenario in which there are N RHs available at the time that a given message M1 is received from the CP at the stateless load balancer, and that the load balancer selects any of the RHs with equal probability. In this example, each of the 10 RHs would have a 10% probability of being chosen for processing M1. If an $11^{th}$ RH were to be added, and the service configuration information available to the load balancer were updated accordingly, the probabilities of selecting any one of the 11 RHs for the same message M1 (were M1 to be received after the configuration change rather than before the configuration change) would now be approximately 9.09%.

For a message 1211 originating at CP 1225, the load balancing algorithm 1208 may select RH 1262A in the example scenario shown in FIG. 12. Message 1211 may then be forwarded to the RH from the stateless load balancer (via NM 1230B). A connection 1233 of a protocol such as TCP may be established between CP 1225 and RH 1262, e.g., via a connectivity establishment message exchange which includes messages being transmitted in both directions between the CP and the RH using the stateless load balancer as an intermediary. In one embodiment, for example, a TCP SYN packet may be sent from the CP (with a destination network address set to an address provided by a DNS server to the CP in response to a DNS request identifying the service as a target), and a SYN-ACK packet may be sent to the CP from the selected RH as part of the connectivity establishment message flow.

NM 1230A may be configured to store flow state information (FSI) 1277A pertaining to messages flowing via the established connection at the client-side host 1220 in the depicted embodiment, and NM 1230B may be configured to store corresponding FSI 1277B at the service-side host 1261A in the depicted embodiment. A message flow may be distinguished in various embodiments from other message flows using a tuple that includes at least a source address (e.g., private IVN address of a CP), a source port, a destination address (e.g., a DNS address assigned to the service, or a private IVN address of a selected RH), a destination port, and a protocol (e.g., TCP). In other embodiments, the tuple may include identifiers of the source IVN (if the source address is part of an address range of an IVN) and/or a destination IVN (if the destination address is part of an address range of another IVN). Respective records of state information may have to be maintained and updated for individual ones of the flows of traffic between various CPs and the network-accessible service, e.g., in order to ensure that messages of the flow are transmitted efficiently, and metrics that can be used to change transmission pathways are collected. FSI 1277A may include identification information of the selected RH 1262A (such as the IVN address of RH 1262A and/or a substrate address of host 1261A), and FSI 1277B may include identification information of the CP 1225 (such as the IVN address of CP 1225 and/or a substrate address of host 1220) in at least some embodiments. Using the FSI 1277A (e.g., the identification information of the selected RH), the NM 1230A may cause one or more subsequent messages directed to the network-accessible service 1240 from the CP 1225 to be received at RH 1262A without using the stateless load balancer 1204 as an intermediary in various embodiments. As such, the stateless load balancer may be bypassed for the subsequent messages, and a more direct alternate path 1234 (e.g., a direct point-to-point substrate network path) may be used for the transmission of the messages between NM 1230A and NM 1230B. The storing of the FSIs 1277A and 1277B at the NMs may represent one example of using rules (similar to rules 177 and 178 of FIG. 1) for bypassing NFEIs of the kind discussed earlier, with the load balancer being the NFEI in the scenario shown in FIG. 12.

The alternate path may continue to be used even if the configuration of the network-accessible changes in various embodiments (as long as RH 1262A remains reachable and responsive)—e.g., the same alternate path 1234 may be used for messages between the CP and the service during a first time period in which the service configuration remains the same as it was when the load balancing decision to select RH 1262A was made, and in a second time period after a configuration change occurs at the service, which would have (at least with a high probability) led to the selection of a different RH were the load balancing algorithm 1208 to be executed for message 1211 after the change. FSI 1277B may similarly be used by NM 1230B to bypass the load balancer for messages sent from the service to the CP in the depicted embodiment. By storing the FSIs at the NMs rather than at the load balancer, the workload of the load balancer may be reduced, and a simpler and more robust load balancer design may be used in the depicted embodiment.

In some embodiments, the input to the load balancing algorithm 1208 may also include the current internal configuration of the load balancer 1204 itself. For example, in one embodiments multiple nodes at one or more layers of an NFIS similar to NFIS 905 of FIG. 9 may be used for the load balancer, and the load balancing algorithm result may change if the number of nodes configured in the load balancer changes. In embodiments in which hashing based on properties of the received message 1211 is used to select the particular NFIS nodes to which the message 1211 is sent, and each such node uses respective node-specific probabilistic parameters to select RHs, for example, the dynamically changing load balancer internal configuration 1209 may also influence the output of the load balancer algorithm. As a result of storing FSI 1277A and 1277B at the NMs, the same RH which was selected for message 1211 may continue to be used even if the internal configuration of the load balancer changes relative to its configuration as of the time at which the RH was first selected in various embodiments.

The RH identification information and/or other elements of FSI 1277A may be obtained at the NM 1230A in encapsulation protocol headers during the establishment of connectivity between the CP and the selected RH in at least some embodiments. Similarly, the identification information of the CP 1225 may be obtained in encapsulation protocol headers at NM 1230B in some embodiments. The contents of such headers may be generated at least in part at the load balancer in the depicted embodiment. In at least some embodiments, the RH identification information may include the substrate network address of host 1261A at which the selected RH runs. In some embodiments, each of the NMs may run at an offloading card of the kind discussed in the context of FIG. 8. Metrics pertaining to the latencies achieved for messages which bypass the load balancer, as compared to latencies achieved for messages which do not bypass the load balancer, may be provided via programmatic interfaces by the network-accessible service in some embodiments. In one embodiment, tags or labels may be included (e.g., within protocol headers) to indicate to the service whether a message was sent via a path which includes the load balancer, or via a path which does not include the load balancer, and such tags/labels may be used to gather the metrics.

Figure 13:
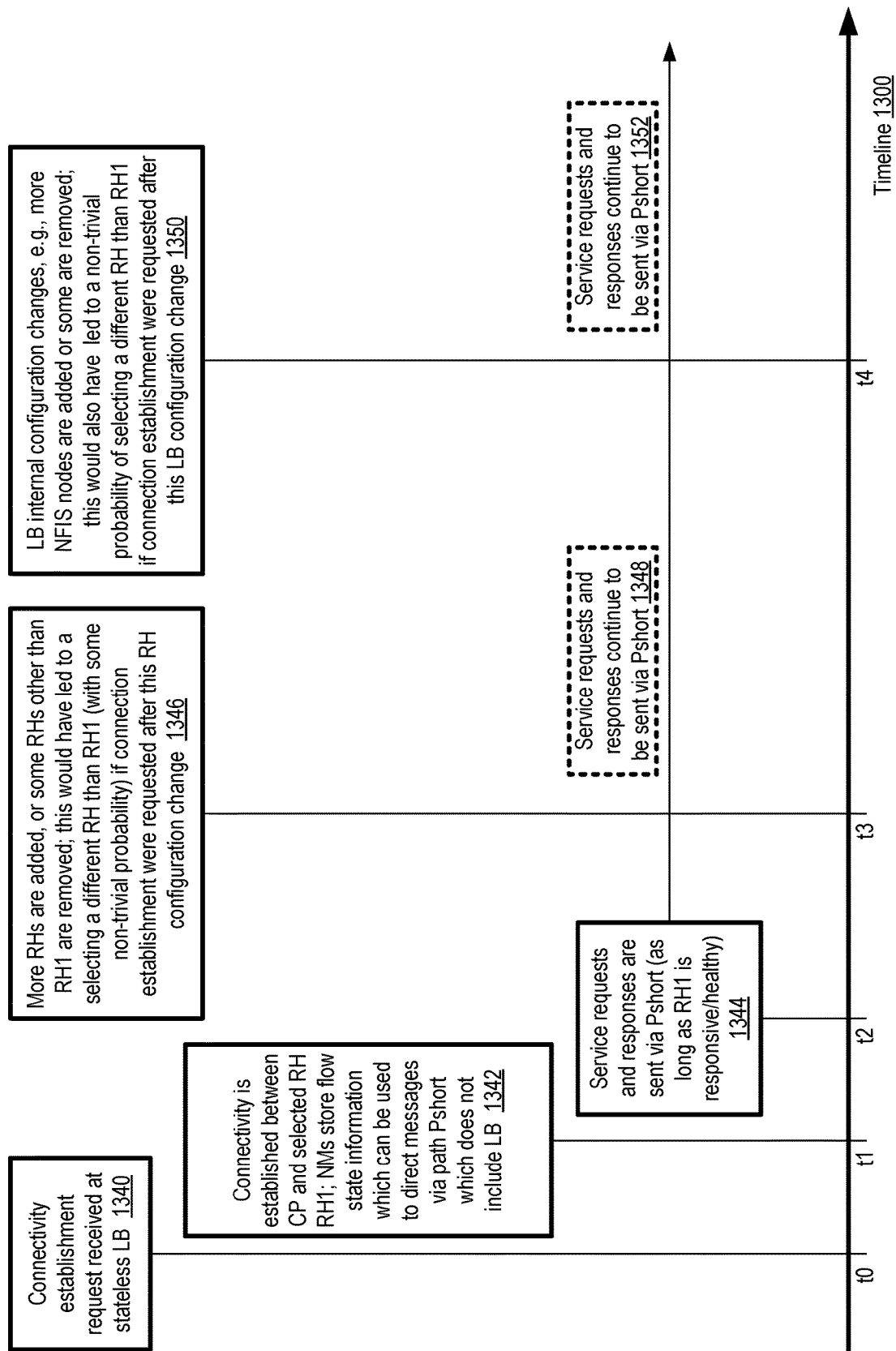
FIG. 13 illustrates an example timeline along which events that would lead to changes in results of a stateless load balancing algorithm are shown, while traffic continues to be transmitted along paths associated with earlier results obtained from the load balancing algorithm, according to at least some embodiments.

FIG. 13 illustrates an example timeline along which events that would lead to changes in results of a stateless load balancing algorithm are shown, while traffic continues to be transmitted along paths associated with earlier results obtained from the load balancing algorithm, according to at least some embodiments. At a time t0 along timeline 1300, a connectivity establishment request may be received from a CP at a stateless load balancer configured for a network-accessible service, as indicated in element 1340. Shortly thereafter, at time t1, connectivity may be established between the CP and a selected RH RH1 of the service, as indicated in element 1342. NMs at the hosts at which the CP and RH1 run may store flow state information which can be used to direct messages (from the CP to RH1, and from RH1 to the CP) via an alternate path Pshort which does not include the load balancer itself.

Service requests may be sent via Pshort, e.g., starting at time t2, and responses to those requests may also be received via Pshort, as long as RH1 remains responsive/healthy and CP remains active (as indicated in element 1344). At time t3, configuration changes are applied at the targeted network-accessible service (element 1346). For example, more RHs may be added to deal with a higher service workload level, or one or more RHs other than R1 may be removed. Such a configuration change would have led, with some non-trivial probability, of selection of a different RH than RH1 if the connection establishment were requested (with all other parameters of the connection establishment request unchanged) after the configuration change. Nevertheless, RH1 and Pshort would to be used for service requests in the time period after t3, as indicated in element 1348.

At time t4, the internal configuration of the load balancer changes (element 1350). For example, more NFIS nodes may be added, or some NFIS nodes that were being used at the time of the selection of RH1 may be removed. These changes would also lead to a non-trivial probability of selection of a different RH if the connection establishment request had been received after the load balancer configuration change. Still, using flow state information of the connection maintained at the NMs, RH1 continues to be used and the shorter path Pshort continues to be used for traffic between the CP and the service in the depicted embodiment, as indicated in element 1352.

Figure 14:
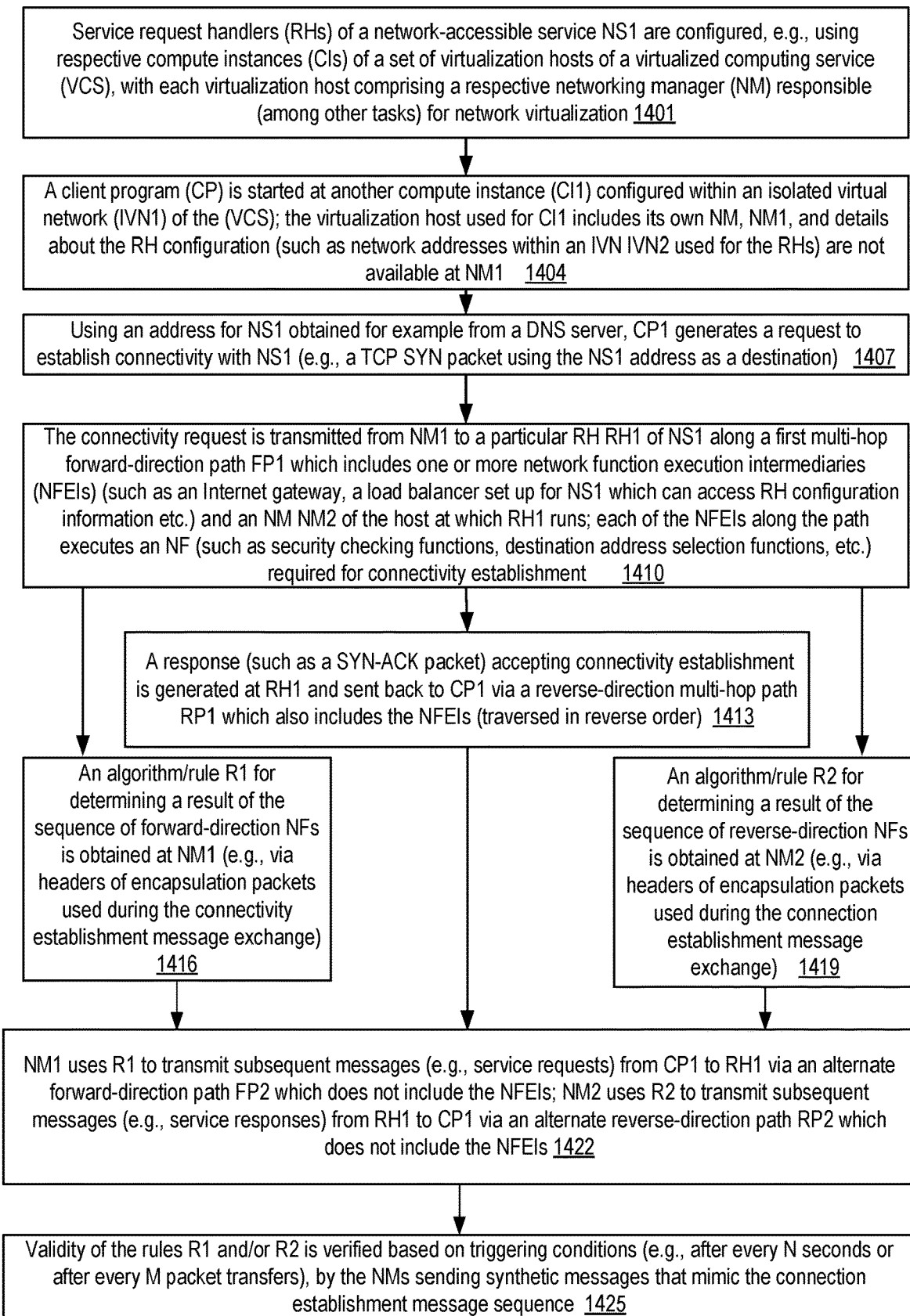
FIG. 14 is a flow diagram illustrating aspects of operations that may be performed to identify and use low-latency alternate paths between client programs and network-accessible services after connectivity has been established between the client programs and the services using a path with one or more intermediaries, according to at least some embodiments.

FIG. 14 is a flow diagram illustrating aspects of operations that may be performed to identify and use low-latency alternate paths between client programs and network-accessible services after connectivity has been established between the client programs and the services using a path with one or more intermediaries, according to at least some embodiments. A set of service request handlers (RHs) of a network-accessible service NS1 may be configured, e.g., using respective compute instances (virtual machines) or other execution environments in the depicted embodiment (element 1401). Individual ones of the RHs may run at respective VHs of a VCS of a cloud provider network in some embodiments. A VH may in turn comprise a respective NM responsible (among other tasks) for network virtualization. As such, an NM may be implemented as part of a virtualization manager of the VH. In some implementations, the NM may run at an offloading card of the kind discussed earlier; in other embodiments, the NM may on primary processors (e.g., CPUs) of the VH, instead of using processors on the offloading card.

A client program (CP1) may be started at another execution environment (such as a compute instance CI2) on another VH in the depicted embodiment (element 1404). CP1 may be configured within an IVN (IVN1) set up for a customer of the VCS in some embodiments, while one or more the RHs may also be set up within a service-side IVN IVN2. The VH used for CP1 may include its own NM, NM1. Details about the service's RH configuration (such as a range of network addresses within IVN2 used for the RHs) may not be available at NM1.

Using an address for NS1 obtained for example via DNS, CP1 may generate a request to establish connectivity with NS1 (e.g., a TCP SYN packet using the DNS-provided service address as a destination) in various embodiments (element 1407). The connectivity request may be transmitted from NM1 to a particular RH RH1 of NS1 along a first multi-hop forward-direction path FP1 which includes a chain of one or more network function intermediaries in the depicted embodiment in addition to a second NM NM2 of the host at which RH1 runs (element 1410). In order to establish connectivity, one or more messages/packets may be transferred in both directions between CP1 and NS1 in at least some embodiments; these transfers may collectively be referred to as connectivity establishment message exchange. The NFEIs may, for example, comprise an Internet gateway (which enables packets to be transmitted from private addresses within the client-side IVN IVN1 to addresses of the public Internet, such as a public Internet address returned by DNS for NS1), a load balancer which selects the appropriate RH RH1 for CP1's packets. Individual ones of the NFEIs along FP1 may perform one or more network functions or packet processing operations in various embodiments, with the net effect of executing a sequence of network functions (e.g., functions that are composed or combined in the manner shown in FIG. 2) with respect to the original packet generated at CP1. The sequence of network functions may be required for connectivity establishment between a CP and NS1 in the depicted embodiment. A given NFEI may, for example, receive a result of the execution of an NF at a previous NFEI, and apply its own NF to the received result in at least some embodiments. A wide variety of NFs may be executed in the sequence in different embodiments, such as security checking operations (which verify that firewall rules or other security settings of the IVNs involved are not being violated), destination RH address selection functions (e.g., in accordance with a load balancing algorithm), and so on.

As a result of execution of at least some of the NFs along FP1's chain of NFEIs, contents of the packet which originated at CP1 may eventually be delivered to the selected RH RH1 in the depicted embodiment. A response packet (e.g., a SYN-ACK packet if TCP is being used) may be generated at RH1, indicating for example that RH1 has accepted the connectivity request, and sent to CP1 via a reverse-direction multi-hop path RP1 in the depicted embodiment (element 1413). RP1 may include at least some of the NFEIs of FP1, traversed in reverse order. Note that in some embodiments RP1 and FP1 may not include the same number of NFEIs.

An algorithm or rule R1 for determining, at the VH at which CP1 runs, a result of the sequence of forward-direction NFs (the network functions executed along FP1, performed in the sequence in which they were executed along FP1) may be obtained at NM1 in the depicted embodiment (element 1416). In at least one embodiment, R1 may be obtained in a header of an encapsulation protocol packet used during the connectivity establishment message exchange. In another embodiment, R1 may be obtained via a control plane component of a VCS or NS1—e.g., an NFEI may supply the result of the sequence of NFs of FP1 to the control plane component, and the control plane component may forward the information on to NM1. In some embodiments, R1 may be relatively simple to implement: e.g., a record indicating the physical network address of the host at which the selected RH runs may be provided to NM1, along with the association of that physical network address with NS1's DNS-provided address, and executing the rule may require NM1 to look up that record when subsequent packets directed to NS1 are received at NM1 from CP1. In other embodiments, executing R1 may be more complex, and source code or executable code for executing R1 may be provided to NM1, along with data (if any) to be consumed as input by the code when computing the NF sequence results for subsequent packets of the flow from CP1 to NS1. The code may be executed at NM1 or on behalf of NM1 for subsequent packets from CP1 in some embodiments.

Similarly, an algorithm or rule R2 for determining a result of the sequence of reverse-direction NFs (the network functions executed along RP1, performed in the sequence in which they were executed along RP1) at the VH at which RH1 runs may be obtained at NM2 in the depicted embodiment (element 1419). In at least one embodiment, R2 may be obtained in a header of an encapsulation protocol packet used during the connectivity establishment message exchange. In another embodiment, R2 may be obtained via a control plane component of a VCS or NS1—e.g., an NFEI may supply the result of the sequence of NFs of RP1 to the control plane component, and the control plane component may forward the information on to NM2. In some embodiments, R2 may be relatively simple to implement: e.g., a record indicating the physical network address of the host at which CP1 runs may be provided to NM2, along with the association of that physical network address with CP1's IVN address, and executing the rule may require NM2 to look up that record when subsequent packets directed to CP1 are received at NM2 from RH1. In other embodiments, executing R2 may be more complex, and source code or executable code for executing R2 may be provided to NM2, along with data (if any) to be consumed as input by the code for subsequent packets of the flow from RH1 to CP1. The code may be executed at NM2 or on behalf of NM2 for subsequent packets from RH1 to CP1 in some embodiments.

NM1 may utilize R1 to transmit subsequent messages (e.g., service requests) from CP1 to RH1 via an alternate forward-direction path FP2 which does not include at least some of the NFEIs of the chain which was used for the initial packet sent from CP1 in the depicted embodiment (element 1422). The alternate path FP2 may include fewer hops than FP1, and may therefore lead to reduced latency than the latency typically achieved for messages sent via FP1. FP1 may be referred to as a baseline forward-direction path, while FP2 may be referred to as an optimized forward-direction path in some embodiments. In some cases FP2 may comprise a point-to-point link between the VHs of CP1 and RH1. Similarly, NM2 may utilize R2 to transmit subsequent messages (e.g., service responses) from RH1 to CP1 via an alternate reverse-direction path RP2 which also does not include at least some of the NFEIs of the chain which was used for the initial response sent to CP1 in the depicted embodiment. The alternate path RP2 may include fewer hops than RP1, and may therefore also lead to reduced latency than the latency typically achieved for messages sent via RP1. RP1 may be referred to as a baseline forward-direction path, while RP2 may be referred to as an optimized forward-direction path in some embodiments. FP2 and RP2 may be referred to as bypass paths as they do not pass through all the NFEIs of the FP1 and RP1 respectively. In at least some embodiments, the NMs may use a combination of the baseline paths and the optimized paths—e.g., one out of every N packets sent in the client-to-service direction may be sent via the baseline path, while the remaining (N−1) packets may be sent vie the optimized path. The baseline paths may be considered a backup to the corresponding optimized paths in at least some embodiments, with the backup paths used for example in the event that a problem is encountered along the optimized path.

After some number of messages have been sent via the bypass paths FP2 and/or RP2, the validity of the algorithms/rules (R1 and/or R2) may be verified in various embodiments (element 1425). A number of triggering conditions may lead to the algorithm/rule verification operations in different embodiments—e.g., verification may be initiated after every N1 seconds, after every P1 packets have been transferred, and so on. In some embodiments, the verification operations may be performed using synthetic packets (packets which do not contain any data generated by CP1, or a response generated at NS1) created by NM1 and/or NM2, which are used to mimic the connection establishment message sequence. The NMs may cause such synthetic packets to be received at one or more of the NFEIs in at least one embodiment. If the verification of R1 fails (e.g., because of configuration changes at IVN1 or IVN2, or a change to the number of RH1 configured), a new rule may be obtained at NM1, e.g., by sending one or more packets along FP1 in various embodiments. Similarly, if R2 is found to be invalid, a new rule may be obtained at NM2 using analogous techniques in some embodiments.

FIG. 15 is a flow diagram illustrating aspects of operations that may be performed to enable low-latency stateful load balanced connections to be established with the help of a stateless load balancer, according to at least some embodiments. As shown in element 1501, a stateless load balancer (LB1) may be established or configured to distribute messages directed to a network-accessible service NS1 (such as a database service or a storage service) of a cloud provider network among a set of RHs of the service. LB1 itself may comprise multiple nodes of a distributed network function implementation service (NFIS) similar in features and functionality to NFIS 905 of FIG. 9 in some embodiments. Input to the load balancing algorithm used at LB1 may include properties of the received messages (e.g., IP addresses of the source client programs (CPs) from which a message is received, an identifier of an IVN from which a message is received, etc.) as well as the current configuration of NS1 (such as the number of RHs available for messages from a particular client-side IVN, the addresses of the RHs within a service-side IVN, recent workload levels of the RHs, etc.) in the depicted embodiment. In some embodiments in which multiple nodes of an NFIS are used to implement LB1, the current internal configuration of LB1 (configuration of the set of nodes assigned to implement LB1) may also be considered part of the input of the load balancing algorithm. For example, adding or removing NFIs nodes used for LB1 may also influence the load balancing decisions made. Note that in various embodiments, the configuration of NS1 and/or the NFIS configuration of LB1 may change dynamically based on various factors such as changes in service workloads, changes to NFIS workloads, failures of RHs, failures of NFIS nodes etc., so load balancing decisions may typically be made at LB1 using the most recent version of NS1 configuration (and/or the most recent version of LB1 configuration) known at LB1 at the time that the decisions are needed. If/when the configuration of NS1 changes or the internal configuration of LB1 itself changes, the probability of selecting individual ones of the RHs for a given message from a CP may change in various embodiments. For example, if the number of RHs that are available at NS1 changes, in some cases a different RH may be chosen for the same message than would have been chosen before the change. In embodiments in which the load balancing algorithm is probabilistic, the probability of choosing a given RH may change, based on how large the change to the NS1 configuration is—e.g., if 10 new RHs are added to a pre-existing set of 10 RHs, and a uniform probability of RH selection is assumed, the probability of choosing a given RH may change from 10% to 5%.

A message M1 requesting connectivity establishment with NS1 may be received at LB1 from a client program CP1 in the depicted embodiment (element 1507). CP1 may run (e.g., within an execution environment such as a compute instance of a VCS) at a host H1 with a networking manager NM1. LB1 may select a particular RH RH1 for M1, using the load algorithm and the NS1 currently-available configuration information at the time M1 is received. RH1 may run (e.g., also within an execution environment such as a compute instance of a VCS) at a host H2 with its own networking manager NM2. NM1 and/or NM2 may be part of respective virtualization managers of hosts H1 and H2 in some embodiments. In various embodiments, one or both of NM1 and NM2 may run at an offloading card of the kind described earlier. A connection Conn1 may be established between CP1 and RH1, e.g., via an exchange of messages over a path which includes LB1 in both directions. Flow state information of the messages transmitted via Conn1, including for example identification information of RH1, indicating that RH1 was selected for CP1's messages, may not be stored at LB1 in the depicted embodiment. In some embodiments in which TCP is being used for Conn1, M1 may comprise a SYN packet, and the exchange of connectivity establishment messages may include a SYN-ACK packet sent from RH1 to CP1 via LB1.

NM1 may obtain (e.g., via contents of encapsulation packet headers generated at LB1 during the connectivity establishment message exchange) and store flow state information pertaining to Conn1 in the depicted embodiment (element 1510). The flow state information may for example include identification information of RH1, such as a physical network address of the host at which RH1 runs. The flow state information may also include other elements in some embodiments, such as an indication of a time that has elapsed since a previous message was sent via Conn1 from CP1 to NS1 without using the LB1 as an intermediary, a total number of messages sent via the Conn1, and so on. Similarly, NM2 at H2 may contain and store flow state information pertaining to Conn1, including H1's physical network address in various embodiments. Note that in at least some embodiments an IP address assigned to CP1 may be part of a private IP address range of an IVN set up for a customer of NS1 on whose behalf CP1 is run, and that this IP address may differ from a second IP address (within a cloud provider's physical network) assigned to H1. Similarly, in various embodiments an IP address assigned to RH1 may be part of a private IP address range of a different IVN set up for NS1, and that RH1's IP address may differ from the IP address (within the cloud provider's physical network) assigned to H2. At least a portion of the flow state information may include rules for directing subsequent packets using lower-latency paths after connectivity has been established in some embodiments, similar to the rules described earlier with regard to bypassing NFEI chains. At least a portion of the flow state information may not be accessible to CP1 and/or to RH1 in various embodiments—e.g., CP1 (or the compute instance at which CP1 runs) may not have any information about RH1 or H2, and RH1 may not have information about H1.

For some time period T1 after Conn1 is established, the configuration information of NS1 may not change relative to the information that was used as input for the load balancing decision that led to the selection of RH1, and LB1's internal configuration may also remain unchanged from the configuration at the time that RH1 was selected (element 1513). During this time period T1, NM1 and NM2 may cause messages directed from CP1 to NS1, and messages from NS1 to CP1, to be transmitted via a path which does not include LB1 as an intermediary (element 1516). The use of the alternate path which bypasses LB1, may lead to a reduced latency for client-server interactions of NS1 in at least some embodiments. In come embodiments, the alternate path may comprise a point-to-point link between H1 and H2 over the physical or substrate network of the cloud provider network.

At some point of time, NS1's configuration may change (e.g., RHs may be added or removed) and/or LB1's internal configuration may change (element 1519). Such changes would have (at least with some probability) led to a selection by LB1 of a different RH RH2 for messages from CP1. Some such configuration changes may be initiated, for example, a by a control plane node of NS1, or a control plane node of an NFIS used for implementing LB1. Other configuration changes may occur as a result of failures or errors at the set of RHs, or at the set of NFIS nodes being used for LB1. Despite the configuration change(s), because the flow state information that is being used for the alternate path remains available at NM1 and NM2, NM1 and NM2 may continue to use the same alternate path (which bypasses LB1) between CP1 and RH1 (element 1522) in various embodiments.

Figure 16:
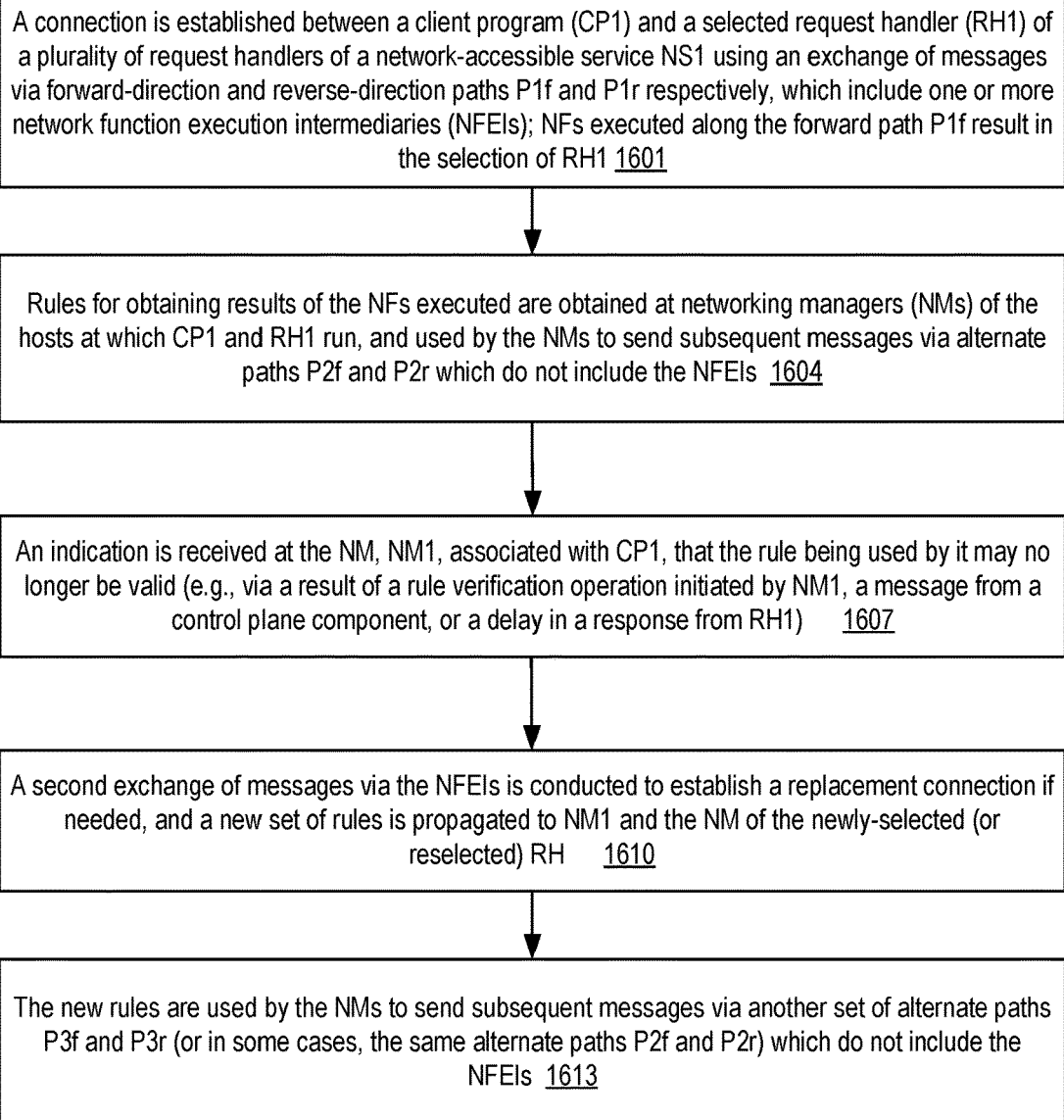
FIG. 16 is a flow diagram illustrating aspects of operations that may be performed to respond to a determination that a rule, which was being used to transmit traffic using a path without network function execution intermediaries, is no longer valid, according to at least some embodiments.

FIG. 16 is a flow diagram illustrating aspects of operations that may be performed to respond to a determination that a rule, which was being used to transmit traffic using a path without network function execution intermediaries, is no longer valid, according to at least some embodiments. As shown in element 1601, a connection may be established between a client program CP1 and a selected request handler RH1 of a plurality of request handlers of a network-accessible service NS1. The connection may be established using an exchange of messages via a forward direction (client to service) path P1f and a reverse direction (service to client) path P1r in the depicted embodiment, where at least one of P1f and P1r may include one or more NFEIs. One or more network functions executed along the forward path P1f may result in the selection of RH1.

Rules for determining results of the NFEIs executed during connection establishment may be obtained and stored at respective NMs of the hosts at which CP1 and RH1 run (element 1604). These rules may be used by the NMs to send subsequent CP1-to-RH1 and RH1-to-CP1 messages via alternate routes P2f (in the forward direction) and P2r (in the reverse direction). P2f and/or P2r may bypass at least one of the NFEIs.

An indication may be received or obtained at NM1, the NM associated with CP1, that the rule being used by it to bypass the NFEIs for messages originating at CP1 may no longer be valid (element 1607). The indication may be received as a result of a rule verification operation initiated by NM1 in some embodiments, in which for example a synthetic packet generated at NM1 is sent along a path which includes the NFEIs. In other embodiments, a control plane node of a VCS or of NS1 may send an out-of-band or control message to NM1 indicating that the rule is no longer valid. In one embodiment, a delay (higher than a selected threshold delay) in a response from RH1 to a packet sent via Rf2 may serve as the indication that the rule may no longer be valid. A similar indication of the invalidity of the rule being used by NM2 (the NM associated with RH1) may be obtained at NM2 in some embodiments.

According to the embodiment shown in FIG. 16, a second exchange of messages via the NFEIs may be conducted if needed to establish a replacement connection (element 1610). Note that in some cases CP1 may decide that further messages need not be sent to NS1, so a replacement connection may not be required. If a new connection is established, a new set of rules may be generated and propagated to NM1 and the NM of the newly-selected (or reselected) RH. The new rules may be used by the NMs to send subsequent messages via another set of alternate paths P3f and P3r which do not include the NFEIs, or the same alternate paths P2f and P2r which were being used before the invalidation of the rule (element 1613).

It is noted that in various embodiments, some of the operations shown in the flow diagrams of FIG. 14, FIG. 15 and/or FIG. 16 may be implemented in a different order than that shown in the figure, or may be performed in parallel rather than sequentially. Additionally, some of the operations shown in FIG. 14, FIG. 15 and/or FIG. 16 may not be required in one or more implementations.

Figure 17:
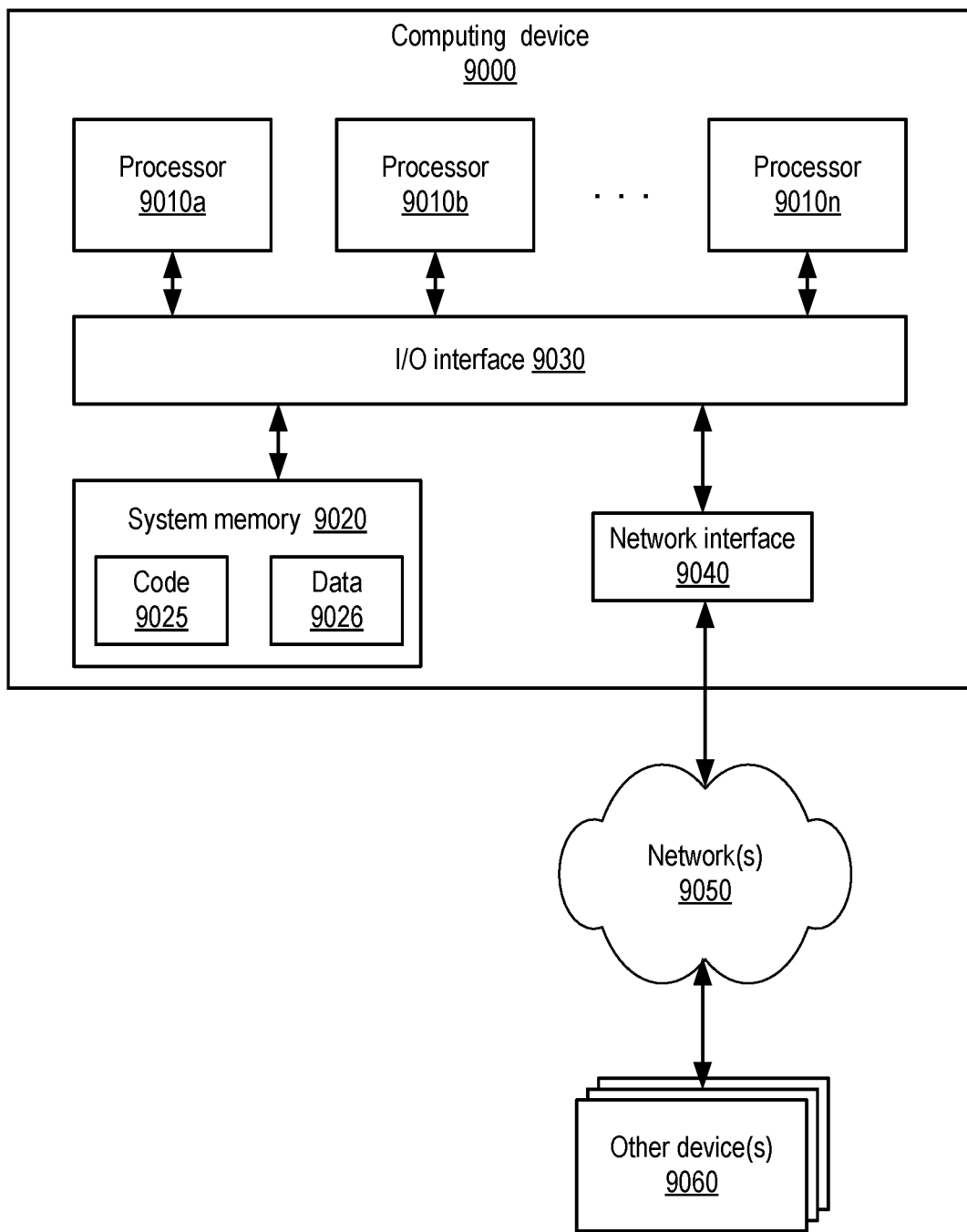
FIG. 17 is a block diagram illustrating an example computing device that may be used in at least some embodiments.

In at least some embodiments, a server that implements the types of techniques described herein (e.g., various operations of a provider network service such as a VCS, a database service, or a storage service), may include a general-purpose computer system that includes or is configured to access one or more computer-accessible media. FIG. 17 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 16, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 16. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing devices comprising respective processors and memory and configured to implement a plurality of request handlers of a network-accessible service of a cloud provider network;
a first host external to the network-accessible service, wherein the first host comprises one or more respective processors and memory configured to implement a networking manager and a client program of the service; and
one or more processors and memory configured to implement a stateless load balancer;
wherein the stateless load balancer is configured to:
select, for processing a first message directed to the network-accessible service from the client program, a particular request handler from the plurality of request handlers, wherein the particular request handler is selected using an algorithm whose input includes (a) one or more properties of the first message and (b) configuration information of the network-accessible service, available at the stateless load balancer when the first message is received at the stateless load balancer, wherein the configuration information includes (a) the number of request handlers included in the plurality of request handlers and (b) respective network addresses, within an isolated virtual network configured for the network-accessible service, of individual request handlers of the plurality of request handlers, and wherein, with respect to a given message provided as input to the algorithm, a change in the number of request handlers results in a change in a probability of selection of individual ones of the plurality of request handlers for the given message;
cause a network connection to be established between the client program and the particular request handler, wherein flow state information pertaining to messages transmitted via the network connection is not stored at the stateless load balancer; and
wherein the networking manager is configured to:
store flow state information pertaining to messages transmitted via the network connection, wherein the flow state information includes identification information of the particular request handler;
cause, using the identification information, a second message directed to the network-accessible service from the client program to be received at the particular request handler without using the stateless load balancer as an intermediary, wherein the second message is received at the particular request handler during a first time interval in which the configuration information of the network-accessible service has not changed relative to the configuration information which was used to select the particular request handler via the algorithm; and
cause, using the identification information, a third message directed to the network-accessible service from the client program to be received at the particular request handler without using the stateless load balancer as an intermediary, wherein the third message is received at the particular request handler during a second time interval in which, as a result of at least a change in the number of request handlers, the configuration information of the network-accessible service has changed relative to the configuration information which was used to select the particular request handler via the algorithm.

2. The system as recited in claim 1, wherein the stateless load balancer comprises a set of nodes of a network function implementation service, and wherein input of the algorithm comprises configuration information of the set of nodes.

3. The system as recited in claim 2, wherein the networking manager is further configured to:
cause, by the networking manager using the identification information, a fourth message directed to the network-accessible service from the client program to be received at the particular request handler without using the stateless load balancer as an intermediary, wherein the fourth message is transmitted from the client program during a third time interval in which the configuration information of the set of nodes has changed relative to the configuration information used to select the particular request handler.

4. The system as recited in claim 1, wherein the particular request handler runs at a compute instance of a second host, wherein the compute instance is assigned a first network address within the isolated virtual network used by the network-accessible service, wherein the second host is assigned a second network address within a physical network of the cloud provider network, wherein the identification information comprises the second network address, and wherein the second message is sent from the first host to the second host via a point-to-point link of the physical network.

5. The system as recited in claim 1, wherein the flow state information includes one or more of: (a) an indication of a time that has elapsed since a previous message was sent via the network connection from the client program to the network-accessible service without using the stateless load balancer as an intermediary, or (b) a total number of messages sent via the network connection.

6. A computer-implemented method, comprising:
establishing a network connection between a client program and a particular request handler of a network-accessible service, wherein the client program runs at a first host, wherein the particular request handler runs at a second host, wherein the particular request handler is selected by a load balancer from a plurality of request handlers using an algorithm whose input includes configuration information of the network-accessible service, wherein the network connection is established in response to a first message originating at the client program, wherein the first message is directed from the client program to the network-accessible service, and wherein flow state information pertaining to messages transmitted via the network connection is not stored at the load balancer; and
storing, by a networking manager associated with the first host, flow state information pertaining to messages transmitted via the network connection, including identification information of the particular request handler;

causing, by the networking manager using the identification information, a second message directed to the network-accessible service from the client program to be received at the particular request handler without using the load balancer as an intermediary, wherein the second message is transmitted from the client program during a first time interval in which the configuration information of the network-accessible service has not changed relative to the configuration information which was used to select the particular request handler; and causing, by the networking manager using the identification information, a third message directed to the network-accessible service from the client program to be received at the particular request handler without using the load balancer as an intermediary, wherein the third message is transmitted from the client program during a second time interval in which the configuration information of the network-accessible service has changed relative to the configuration information which was used to select the particular request handler.

7. The method as recited in claim 6, wherein establishing the network connection comprises receiving an encapsulation protocol message at the networking manager, wherein at least a portion of the encapsulation protocol message is generated by the load balancer, and wherein the portion of the encapsulation protocol message includes the identification information of the particular request handler.

8. The method as recited in claim 6, wherein the identification information of the particular request handler includes an address, within a physical network of a cloud provider network, of the second host.

9. The method as recited in claim 6, wherein the change to the configuration information of the network-accessible service corresponding to the second time interval comprises one or more of: (a) an addition of one or more request handlers or (b) a removal of one or more request handlers.

10. The method as recited in claim 6, wherein the load balancer comprises a set of nodes of a network function implementation service, and wherein input of the algorithm comprises configuration information of the set of nodes.

11. The method as recited in claim 10, further comprising:
causing, by the networking manager using the identification information, a fourth message directed to the network-accessible service from the client program to be received at the particular request handler without using the load balancer as an intermediary, wherein the fourth message is transmitted from the client program during a third time interval in which the configuration information of the set of nodes has changed relative to the configuration information of the set of nodes which was used to select the particular request handler.

12. The method as recited in claim 6, wherein the networking manager runs at an offloading card of the first host.

13. The method as recited in claim 6, wherein the network-accessible service comprises one of: (a) a database service or (b) a storage service.

14. The method as recited in claim 6, further comprising:
providing, via a programmatic interface (a) a first set of metrics pertaining to transmission of messages between the client program and the network-accessible service via a path which does not include the load balancer and (b) a second set of metrics pertaining to transmission of messages between the client program and the network-accessible service via a path which does include the load balancer as an intermediary.

15. The method as recited in claim 6, further comprising:
causing, by the networking manager, a bypass signal to be included in an encapsulation packet used to transfer the second message, wherein the bypass signal indicates that the second message is transferred using a path which does not include the load balancer as an intermediary, and wherein the bypass signal is not included in encapsulation packet used to transfer the first message; and initiating, at the network-accessible service, an operation based at least in part on detecting the bypass signal.

16. A non-transitory computer-accessible storage medium storing program instructions that when executed on a processor:
cause a network connection to be established between a client program and a particular request handler of a network-accessible service, wherein the client program runs at a first host, wherein the particular request handler is selected by a load balancer from a plurality of request handlers using an algorithm whose input includes configuration information of the network-accessible service, wherein the network connection is established in response to a first message originating at the client program, wherein the first message is directed to the network-accessible service, and wherein flow state information pertaining to messages transmitted via the network connection is not stored at the load balancer; and store, by a networking manager associated with the first host, flow state information pertaining to messages transmitted via the network connection, including identification information of the particular request handler;

cause, by the networking manager using the identification information, a second message directed to the network-accessible service from the client program to be received at the particular request handler without using the load balancer as an intermediary, wherein the second message is transmitted from the client program during a first time interval in which the configuration information of the network-accessible service has not changed relative to the configuration information which was used to select the particular request handler using the algorithm; and cause, by the networking manager using the identification information, a third message directed to the network-accessible service from the client program to be received at the particular request handler without using the load balancer as an intermediary, wherein the third message is transmitted from the client program during a second time interval in which the configuration information of the network-accessible service has changed relative to the configuration information which was used to select the particular request handler using the algorithm.

17. The non-transitory computer-accessible storage medium as recited in claim 16, storing further program instructions that when executed on the processor:
cause the identification information of the particular request handler to be obtained by the networking manager in an encapsulation packet.

18. The non-transitory computer-accessible storage medium as recited in claim 16, wherein the identification information of the particular request handler includes an address, within a physical network of a cloud provider network, of a second host at which the particular request handler runs.

19. The non-transitory computer-accessible storage medium as recited in claim 16, wherein the particular request handler runs at a compute instance at a second host, the non-transitory computer-accessible storage medium storing further program instructions that when executed on the processor:
- cause, without using the load balancer as an intermediary, the identification information be updated to indicate a migration of the compute instance from the second host to a third host; and
- cause, by the networking manager using the updated identification information after the compute instance has been migrated, a fourth message directed to the network-accessible service from the client program to be delivered to the request handler without using the load balancer as an intermediary.

20. The non-transitory computer-accessible storage medium as recited in claim 16, wherein the first host comprises a virtualization manager, and wherein the networking manager is part of the virtualization manager.

\* \* \* \* \*